(12) United States Patent
Cox et al.

(10) Patent No.: US 10,306,327 B2
(45) Date of Patent: *May 28, 2019

(54) METHOD AND APPARATUS FOR PROVIDING ENHANCED ELECTRONIC PROGRAM GUIDE WITH PERSONALIZED SELECTION OF BROADCAST CONTENT USING AFFINITIES DATA AND USER PREFERENCES

(71) Applicant: Sirius XM Radio Inc., New York, NY (US)

(72) Inventors: Stuart A. Cox, Boca Raton, FL (US); Michael A. Barton, Coral Springs, FL (US)

(73) Assignee: Sirius XM Radio Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,738

(22) Filed: Jun. 27, 2016

(65) Prior Publication Data

US 2016/0381429 A1    Dec. 29, 2016

Related U.S. Application Data

(63) Continuation of application No. 13/933,350, filed on Jul. 2, 2013, now Pat. No. 9,392,334, which is a
(Continued)

(51) Int. Cl.
*G06F 3/00* (2006.01)
*G06F 13/00* (2006.01)
(Continued)

(52) U.S. Cl.
CPC ..... *H04N 21/4826* (2013.01); *H04N 5/44543* (2013.01); *H04N 21/252* (2013.01);
(Continued)

(58) Field of Classification Search
CPC ............ H04N 21/4826; H04N 21/252; H04N 5/44543; H04N 21/26283;
(Continued)

(56) References Cited

U.S. PATENT DOCUMENTS 6,163,316 A   12/2000 Killian
6,282,412 B1   8/2001 Lyons
(Continued)

FOREIGN PATENT DOCUMENTS

WO   WO2009070343 A1   6/2009

*Primary Examiner* — Nnenna N Ekpo
(74) *Attorney, Agent, or Firm* — Kramer Levin Naftalis & Frankel LLP

(57) ABSTRACT

Apparatuses and methods are provided to inform a user of a broadcast stream, which has multiple, concurrently received channels of program content, about recommendations of a subset of the content currently playing across the available channels or to be played within a selected future time period. The subset of content is selected based on user preferences and system data (e.g., program topic and channel affinities among the broadcast content and channels) to recommend a more diverse subset of content than would be discovered if only user preferences were employed to make the selection of recommended content.

19 Claims, 23 Drawing Sheets

Related U.S. Application Data continuation of application No. 12/775,703, filed on May 7, 2010, now Pat. No. 8,490,136.

(60) Provisional application No. 61/213,107, filed on May 7, 2009.

(51) Int. Cl.

| | |
|---|---|
| *H04N 5/445* | (2011.01) |
| *H04N 21/482* | (2011.01) |
| *H04N 21/25* | (2011.01) |
| *H04N 21/262* | (2011.01) |
| *H04N 21/442* | (2011.01) |
| *H04N 21/45* | (2011.01) |
| *H04N 21/475* | (2011.01) |
| *H04N 21/658* | (2011.01) |
| *H04N 21/466* | (2011.01) |

(52) U.S. Cl.
CPC . *H04N 21/26283* (2013.01); *H04N 21/44222* (2013.01); *H04N 21/4532* (2013.01); *H04N 21/4668* (2013.01); *H04N 21/4755* (2013.01); *H04N 21/482* (2013.01); *H04N 21/4821* (2013.01); *H04N 21/6582* (2013.01)

(58) Field of Classification Search
CPC ........ H04N 21/44222; H04N 21/4532; H04N 21/4668; H04N 21/4755; H04N 21/482; H04N 21/4821; H04N 21/6582
USPC ................ 725/10, 12, 34, 39, 44, 45, 46, 47
See application file for complete search history.

(56) References Cited

U.S. PATENT DOCUMENTS

| | | | |
|---|---|---|---|
| 6,985,694 | B1 | 1/2006 | De Bonet et al. |
| 7,058,694 | B1 | 6/2006 | De Bonet et al. |
| 7,076,202 | B1 | 7/2006 | Billmaier |
| 7,110,720 | B1 | 9/2006 | Henderson |
| 7,369,825 | B2 | 5/2008 | Slupe |
| 7,454,166 | B2 | 11/2008 | Patsiokas et al. |
| 7,475,417 | B2 | 1/2009 | Marsh |
| 7,644,427 | B1 | 1/2010 | Horvitz et al. |
| 7,657,907 | B2 | 2/2010 | Fennan et al. |
| 7,979,880 | B2 | 7/2011 | Hosea et al. |
| 2002/0053084 | A1* | 5/2002 | Escobar ............ H04N 7/17318 725/47 |
| 2003/0026344 | A1 | 2/2003 | Rindsberg et al. |
| 2003/0131355 | A1 | 7/2003 | Berenson et al. |
| 2004/0172647 | A1 | 9/2004 | Godwin |
| 2006/0020973 | A1 | 1/2006 | Hannum et al. |
| 2006/0206912 | A1 | 9/2006 | Klarfeld et al. |
| 2007/0156589 | A1* | 7/2007 | Zimler .................. H04H 60/65 705/51 |
| 2007/0288966 | A1 | 12/2007 | Javid et al. |
| 2008/0040430 | A1* | 2/2008 | Shivaji-Rao ...... G06F 17/30035 709/205 |
| 2008/0229359 | A1 | 9/2008 | Robinson |
| 2010/0162317 | A1* | 6/2010 | Xu ..................... H04N 5/44543 725/46 |
| 2010/0169153 | A1* | 7/2010 | Hwacinski ............. G06Q 30/02 705/7.31 |
| 2012/0102523 | A1 | 4/2012 | Herz et al. |
| 2012/0221505 | A1* | 8/2012 | Evans .................... G06Q 10/10 706/52 |
| 2012/0266192 | A1 | 10/2012 | Crew et al. |

\* cited by examiner

FIG. 3A

| PROGRAMS | | | FORMAT: MUSIC | FORMAT: TALK | FORMAT: INTERVIEW | FORMAT: NARRATIVE | AUDIENCE: KIDS-MIDDLE | AUDIENCE: WOMEN | AUDIENCE: ADULT xL | MUSIC: 50s | MUSIC: 60s | MUSIC: 70s | MUSIC: 80s | MUSIC: 90s |
|---|---|---|---|---|---|---|---|---|---|---|---|---|---|---|
| PROGRAM | CH | CH NAME | | | | | | | | | | | | |
| 50s MUSIC | 5 | 50s ON 5 | ✓ | | | | | | | ✓ | | | | |
| 60s MUSIC | 6 | 60s ON 6 | ✓ | | | | | | | | ✓ | | | |
| 70s MUSIC | 7 | 70s ON 7 | ✓ | | | | | | | | | ✓ | | |
| CASEY KASEM - 1984... | 8 | 80s ON 8 | ✓ | | | | | | | | | | ✓ | |
| 90s MUSIC | 9 | 90s ON 9 | ✓ | | | | | | | | | | | ✓ |
| SUPERSTARS OF POP... | 28 | THE BLEND | ✓ | | | | | | | | | | | |
| FAITH, HOPE, AND MUSIC | 32 | THE MESSAGE | ✓ | ✓ | | | | | | | | | | |
| SEXY TALES FROM... | 100 | KL HOWARD 100 | | ✓ | | | | | ✓ | | | | | |
| RADIO DISNEY MUSIC | 115 | RADIO DISNEY | ✓ | | | | ✓ | | | | | | | |
| CONCERT FEATURING DOGS... | 116 | KIDS PLACE LIVE | ✓ | | | | ✓ | | | | | | | |
| SUSAN KOHLER AUTHOR OF... | 119 | DOCTOR RADIO | | ✓ | ✓ | | | | | | | | | |
| TERRY GROSS INTERVIEWS... | 124 | NPR NOW | | ✓ | ✓ | | | ✓ | | | | | | |
| UNCENSORED CANADIAN... | 153 | KL LAUGH ATTACK | | ✓ | | | | | ✓ | | | | | |
| PORTRAIT OF THE ARTIST... | 163 | BOOK RADIO | | | | ✓ | | | | | | | | |
| TOO MUCH ENERGY (AN... | 164 | RADIO CLASSICS | ✓ | | | | | | | | | | | |
| MARK LEVIN DISCUSSES... | 166 | AMERICA RIGHT | | ✓ | | | | | | | | | | |
| MIKE MALLOY DISCUSSES... | 167 | AMERICA LEFT | | ✓ | | | | | | | | | | |
| FAMILY MATTERS WITH... | 170 | FAMILY TALK | | ✓ | | | | | | | | | | |
| ... | ... | ... | ... | ... | ... | ... | ... | ... | ... | ... | ... | ... | ... | ... |

TO FIG. 3B

| MUSIC: POP CLASSICS | POLITICS: CONSERVATIVE | POLITICS: LIBERAL | COMEDY | RELIGION: CHRISTIANITY | INTERESTS: HEALTH | INTERESTS: BOOKS | CURRENT: HEALTH CARE REFORM | CURRENT: H1N1 |
|---|---|---|---|---|---|---|---|---|
| | | | | | | | | |
| | | | | | | | | |
| ✓ | | | | | | | | |
| | | | | | | | | |
| | | | | | | | | |
| | | | | | | | | |
| | | | | | | | | |
| | | | | ✓ | | | | |
| | | | ✓ | | | | | |
| | | | | | ✓ | | | |
| | | | | | | ✓ | | |
| | | | | | | | ✓ | |
| | | | | | | | | |
| | ✓ | | | | | | | ✓ |
| | | ✓ | | | | | | |
| ... | ... | ... | ... | ... | ... | ... | ... | ... |

↑ FROM FIG. 3A

FIG. 3B

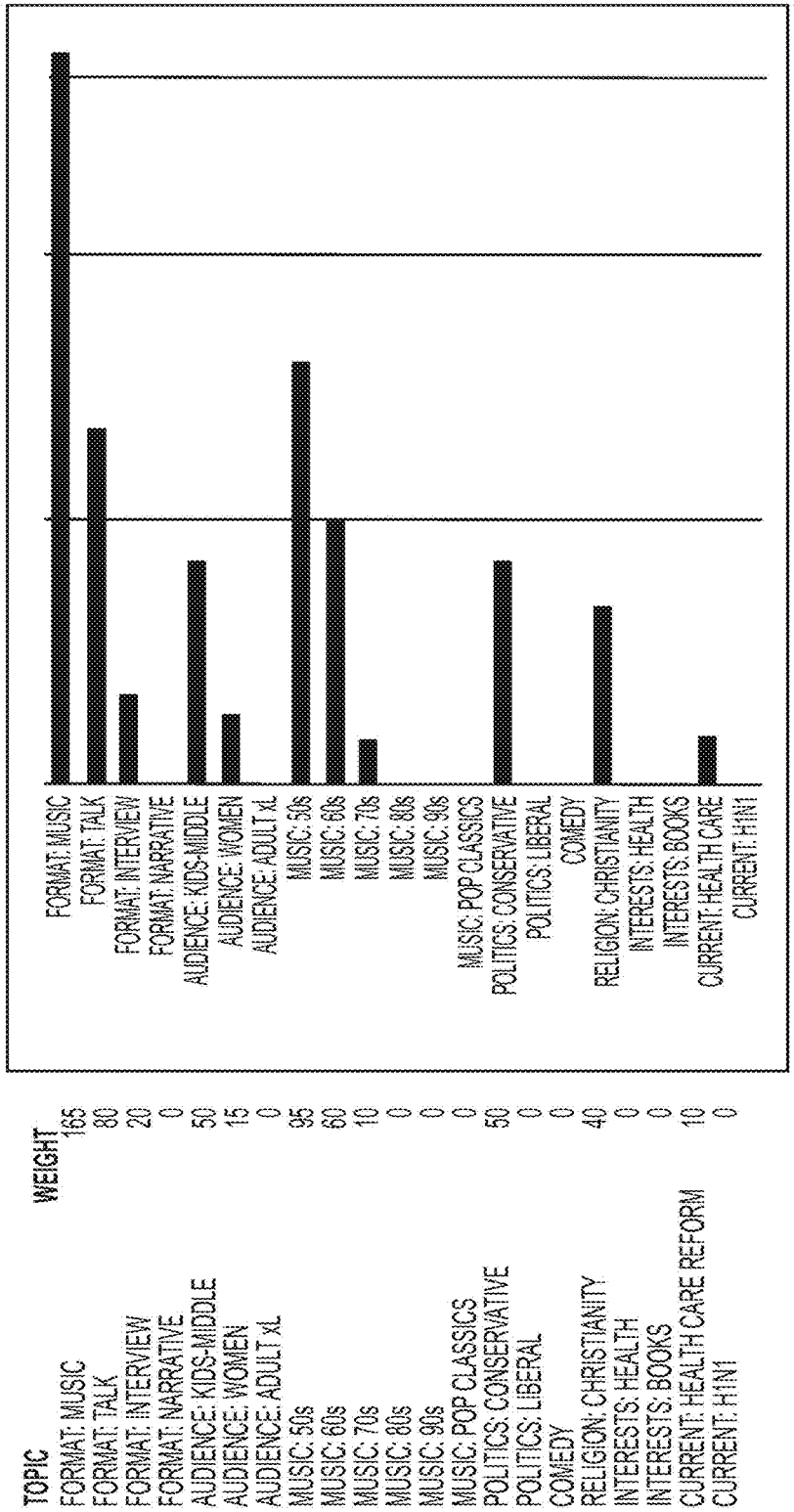
FIG. 4A — LISTENING HISTORY TABLE
FIG. 4B — PERSONAL LISTENING HISTORY DATA

| PROGRAM | CH | CH NAME |
|---|---|---|
| 50s MUSIC | 5 | 50s ON 5 |
| 60s MUSIC | 6 | 60s ON 6 |
| RADIO DISNEY MUSIC | 115 | RADIO DISNEY |
| MARK LEVIN DISCUSSES... | 166 | AMERICA RIGHT |
| FAITH, HOPE, AND MUSIC | 32 | THE MESSAGE |
| 70s MUSIC | 7 | 70s ON 7 |
| CONCERT FEATURING DOGS... | 116 | KIDS PLACE LIVE |
| TOO MUCH ENERGY (JAN,... | 164 | RADIO CLASSICS |
| SUPERSTARS OF POP... | 25 | THE BLEND |
| FAMILY MATTERS WITH... | 170 | FAMILY TALK |
| HEALTH CARE CONNECT... | 119 | DOCTOR RADIO |
| TERRY GROSS INTERVIEWS... | 134 | NPR NOW |
| PORTRAIT OF THE ARTIST... | 163 | BOOK RADIO |
| CASEY KASEM - 1984... | 8 | 80s ON 8 |
| 90s MUSIC | 9 | 90s ON 9 |
| UNCENSORED CANADIAN... | 153 | xL LAUGH ATTACK |
| MIKE MALLOY DISCUSSES... | 167 | AMERICA LEFT |
| SEXY TALES FROM... | 100 | xL HOWARD 100 |
| ... | ... | ... |

PERSONALIZED AFFINITIES TABLE

FIG. 6

| PROGRAM | CH | CH NAME | Feature? | Highlight? |
|---|---|---|---|---|
| SEXY TALES FROM... | 100 | xL HOWARD 100 | ✓ | ✓ |
| TERRY GROSS INTERVIEWS... | 134 | NPR NOW | ✓ | ✓ |
| CASEY KASEM - 1984... | 8 | 80s ON 8 | ✓ | |
| CONCERT FEATURING DOG... | 116 | KIDS PLACE LIVE | ✓ | |
| SUSAN KOHLER, AUTHOR OF... | 119 | DOCTOR RADIO | ✓ | |
| PORTRAIT OF THE ARTIST... | 163 | BOOK RADIO | ✓ | |
| TOO MUCH ENERGY (JAN,... | 164 | RADIO CLASSICS | ✓ | |
| FAMILY MATTERS WITH... | 170 | FAMILY TALK | | |
| 50s MUSIC | 5 | 50s ON 5 | | |
| 60s MUSIC | 6 | 60s ON 6 | | |
| 70s MUSIC | 7 | 70s ON 7 | | |
| 90s MUSIC | 9 | 90s ON 9 | | |
| SUPERSTARS OF POP... | 25 | THE BLEND | | |
| FAITH, HOPE, AND MUSIC | 32 | THE MESSAGE | | |
| RADIO DISNEY MUSIC | 115 | RADIO DISNEY | | |
| UNCENSORED CANADIAN... | 153 | xL LAUGH ATTACK | | |
| MARK LEVIN DISCUSSES... | 166 | AMERICA RIGHT | | |
| MIKE MALLOY DISCUSSES... | 167 | AMERICA LEFT | | |
| ... | | | | |

PROGRAM PRIORITIES LIST

FIG. 5

| PROGRAM | CH | CH NAME | Feature? | Highlight? |
|---|---|---|---|---|
| TERRY GROSS INTERVIEWS... | 134 | NPR NOW | ✓ | ✓ |
| CONCERT FEATURING DOG... | 116 | KIDS PLACE LIVE | ✓ | |
| TOO MUCH ENERGY (JAN... | 164 | RADIO CLASSICS | ✓ | |
| SUSAN KOHLER, AUTHOR OF... | 119 | DOCTOR RADIO | ✓ | |
| FAMILY MATTERS WITH... | 170 | FAMILY TALK | ✓ | |
| PORTRAIT OF THE ARTIST... | 163 | BOOK RADIO | ✓ | |
| CASEY KASEM - 1984... | 8 | 80s ON 8 | | |
| 50s MUSIC | 5 | 50s ON 5 | | |
| 60s MUSIC | 6 | 60s ON 6 | | |
| RADIO DISNEY MUSIC | 115 | RADIO DISNEY | | |
| MARK LEVIN DISCUSSES... | 166 | AMERICA RIGHT | | |
| FAITH, HOPE, AND MUSIC | 32 | THE MESSAGE | | |
| 70s MUSIC | 7 | 70s ON 7 | | |
| SUPERSTARS OF POP... | 25 | THE BLEND | | |
| 90s MUSIC | 9 | 90s ON 9 | | |
| UNCENSORED CANADIAN... | 153 | xL LAUGH ATTACK | | |
| MIKE MALLOY DISCUSSES... | 167 | AMERICA LEFT | ✓ | |
| SEXY TALES FROM... | 100 | xL HOWARD 100 | ... | ... |

SUGGESTIONS LISTS

FIG. 7

| WHAT'S HOT NOW | | |
|---|---|---|
| CH 134<br>NPR NOW | FRESH AIR<br>*TERRY GROSS INTERVIEWS OLYMPIA SNOWE* | GO |
| CH 116<br>KIDS PLACE LIVE | RUMPUS ROOM<br>*CONCERT FEATURING DOG ON FLEAS* | GO |
| CH 164<br>RADIO CLASSICS | FIBBER MCGEE<br>*TOO MUCH ENERGY (JAN. 1945)* | GO |
| CH 119<br>DOCTOR RADIO | HEALTHY AGING<br>*SUSAN KOHLER, AUTHOR OF " COMMUNICA...* | GO |

FIG. 8

| PROGRAM GUIDE | MUSIC | SPORTS | NEWS | TALK & ENTERTAINMENT | BEST OF SIRIUS | CHANNEL LINEUP | FEATURED THIS WEEK |

SCHEDULE | MY FAVORITE SHOWS

CHANNEL CATEGORY: Please Select ▾    ◁ Mon 9/7 | Tue 9/8 | Wed 9/9 | Thu 9/10 | Fri 9/11 | Sat 9/12 | Sun 9/13 ▷    JUMP TO TIME: 10:30 PM ▾    TIME ZONE: Eastern ▾

☐ Show Only My Favorite Channels   Edit My Favorite Channels

MONDAY, 9/7

| Service | 10:30 PM Today | 11:00 PM | 11:30 PM | 12:00 AM | 12:30 AM | 1:00 AM |
|---|---|---|---|---|---|---|
| 132 C-SPAN Radio | American Political | Public Event Coverage | | Public Event Coverage | | |
| 133 XM Public Radio | Bob Edwards talks with | The News Hour with Jim Lehrer | | On Point | | On Point |
| 134 NPR Now | Diane Rehm | Infinite Mind | | Radio Times with Marty Moss-Coane | | |
| 135 World Radio Network | KBS World Radio (Korea) | Polish Radio External | DeutscheWelle | Radio Netherlands | | Israel Radio |
| 136 Public Radio Exchange | PRX: Public Radio Exchange | | | PRX: Public Radio Exchange | | |
| 137 SIRIUS Left | Mike Malloy | | | The Thom Hartmann Show - Sirius Left | | |

FEATURED HIGHLIGHT Getting Late | Raw Dog Comedy | 11:00 PM - 12:00 AM

◁ EARLIER                                                                                               LATER ▷

FIG. 9

| | | MAJOR TOPICS | | | | | | |
|---|---|---|---|---|---|---|---|---|
| FORMAT | AUDIENCE | MUSIC | POLITICS | RELIGION | SPORTS | COMEDY | INTERESTS | CURRENT |
| MUSIC | KIDS - PRESCHOOL | 40s | CONSERVATIVE | CHRISTIANITY | MLB | STAND-UP | HEALTH | HEALTH CARE REFORM |
| TALK | KIDS - MIDDLE | 50s | LIBERAL | JUDAISM | NFL | POLITICAL | FITNESS | H1N1 |
| NEWS | KIDS - PRETEEN | 60s | LEGISLATION | ISLAM | NHL | URBAN | MEDICINE | MICHAEL JACKSON |
| INTERVIEW | ADULT | 70s | WHITE HOUSE | BUDDHISM | NBA | SOUTHERN | FAMILY | OPRAH |
| NARRATION | WOMEN | 80s | LAW | CATHOLIC | RACING | ... | GARDENING | ... |
| LIVE SPORTS | MEN | 90s | FOREIGN POLICY | PROTESTANT | TENNIS | | HOME | |
| ... | ADULT - xL | POP CLASSICS | EUROPEAN | ... | GOLF | | AUTO | |
| | ... | CURRENT POP | ASIAN | | ... | | BOOKS | |
| | | ROCK | WORLD | | | | ... | |
| | | METAL | ... | | | | | |
| | | URBAN | | | | | | |
| | | ALTERNATIVE | | | | | | |
| | | CHILDREN'S | | | | | | |
| | | ... | | | | | | |

MINOR TOPICS

FIG. 10

TOPIC AFFINITY TABLE

| MAJOR.MINOR TOPICS | FORMAT. MUSIC | FORMAT. TALK | FORMAT. INTERVIEW | FORMAT. NARRATIVE | AUDIENCE. KIDS-MIDDLE | AUDIENCE. WOMEN | AUDIENCE. ADULT XL | MUSIC. 50s | MUSIC. 60s | MUSIC. 70s | MUSIC. 80s | MUSIC. 90s | MUSIC. POP CLASSICS |
|---|---|---|---|---|---|---|---|---|---|---|---|---|---|
| FORMAT.MUSIC | 2 | | | | | | | | | | | | |
| FORMAT.TALK | | 2 | | | | | | | | | | | |
| FORMAT.INTERVIEW | | 2 | 2 | | | | | | | | | | |
| FORMAT.NARRATIVE | | | | 2 | | | | | | | | | |
| AUDIENCE.KIDS-MIDDLE | | | | | 2 | | | | | | | | |
| AUDIENCE.WOMEN | | | | | | 2 | | | | | | | |
| AUDIENCE.ADULT XL | | | | | | | 2 | | | | | | |
| MUSIC.50s | | | | | | | | 2 | | | | | |
| MUSIC.60s | | | | | | | | 1 | 2 | 1 | | | |
| MUSIC.70s | | | | | | | | | 1 | 2 | 1 | | |
| MUSIC.80s | | | | | | | | | | 1 | 2 | 1 | |
| MUSIC.90s | | | | | | | | | | | 1 | 2 | |
| MUSIC.POP CLASSICS | | | | | | | | | | | | | 2 |
| POLITICS.CONSERVATIVE | | | | | | | | 0 | 0 | 0 | 0 | 0 | 0 |
| POLITICS.LIBERAL | | | | | | | | 0 | 0 | 0 | 0 | 0 | 0 |
| COMEDY | | | | | | | | 0 | 0 | 0 | 0 | 0 | 0 |
| RELIGION.CHRISTIANITY | | | | | | | | 0 | 0 | 0 | 0 | 0 | 0 |
| INTERESTS.HEALTH | | | | | | | | 0 | 0 | 0 | 0 | 0 | 0 |
| INTERESTS.BOOKS | | | | | | | | 0 | 0 | 0 | 0 | 0 | 0 |
| CURRENT.HEALTH CARE REFORM | | | | | | | | 0 | 0 | 0 | 0 | 0 | 0 |
| CURRENT.H1N1 | | | | | | | | 0 | 0 | 0 | 0 | 0 | 0 |

| POLITICS: CONSERVATIVE | POLITICS: LIBERAL | COMEDY | RELIGION: CHRISTIANITY | INTERESTS: HEALTH | INTERESTS: BOOKS | CURRENT: HEALTH CARE REFORM | CURRENT: H1N1 |
|---|---|---|---|---|---|---|---|
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| 2 | | | | | | | |
| -1 | 2 | 2 | | | | | |
| 0 | 0 | 0 | 2 | 2 | | | |
| 0 | 0 | 0 | 0 | 0 | 2 | | |
| 0 | 0 | 0 | 0 | 2 | 0 | 2 | |
| 0 | 0 | 0 | 0 | 2 | 0 | | 2 |

FROM FIG. 11A →

FIG. 11B

METHOD AND APPARATUS FOR PROVIDING ENHANCED ELECTRONIC PROGRAM GUIDE WITH PERSONALIZED SELECTION OF BROADCAST CONTENT USING AFFINITIES DATA AND USER PREFERENCES

This application is a continuation application of U.S. patent application Ser. No. 13/933,350, filed Jul. 2, 2013, which issued as U.S. Pat. No. 9,392,334 and U.S. patent application Ser. No. 12/775,703, filed May 7, 2010, which issued as U.S. Pat. No. 8,490,136 and claims the benefit of U.S. provisional application Ser. No. 61/213,107, filed May 7, 2009, the entire contents of which are incorporated herein by reference.

CROSS-REFERENCE TO RELATED PATENT APPLICATIONS

Related subject matter is disclosed and claimed in U.S. patent application Ser. No. 10/831,343, filed Apr. 26, 2004 (now issued as U.S. Pat. No. 7,454,166), in U.S. patent application Ser. No. 12/213,414, filed Jun. 18, 2008 (now issued as U.S. Pat. No. 8,223,975), and in PCT Application No. PCT/US08/14013, filed Dec. 23, 2008 (published as WO 2009/070343), the entire contents of which are incorporated herein by reference.

BACKGROUND OF THE INVENTION

Field of the Invention

The present invention relates to an apparatus and method for providing an enhanced Electronic Program Guide (EPG) for devices receiving broadcast content such as Satellite Digital Audio Radio Service (SDARS) programming. More particularly, the present invention relates to an apparatus and method for generating an enhanced EPG for display at a receiving device (e.g., a stationary or mobile SDARS radio receiver) that provides listings of content selected according to broadcast system affinities and a user's preferences.

Description of the Related Art

Products such as satellite radio receivers provide a rich set of entertainment options to users, including over 100 to 200 channels of concurrent audio programs, for example. However, challenges are presented by this huge set of entertainment choices. For example, how does a user easily find a program that is currently playing on one of the many concurrently received channels that is of interest to her? How does a user easily identify an upcoming program that might be of interest to him, and remember to listen to it when it starts playing? How does a user know what kind of content is played on a given channel, and if she likes it, how does she identify other similar channels? If a user is listening to the receiver while driving a car, as can be typical for satellite radio transmission, how can he or she explore the myriad of content choices without a safety risk due to driver distraction while operating the receiver?

Satisfying these needs provides benefits both to the product user and to the entertainment content service provider. To the user, enjoyment of the rich and diverse content is maximized through experiencing a variety of programming that matches the user's interest. With current receivers such as satellite radios, it is common for a user to eventually settle in to listening to only as many channels as can fit on a bank of 6 to 10 previously selected "preset" channels. Due to the extra effort required to search through hundreds of channels, a user will simply cycle through their presets to find something of interest, missing the many programs playing on other channels not in their presets. If it could be easier for the user to explore content across all channels, the user could experience a greater variety of entertainment and likely discover or locate content that is consistently of high interest to them.

For the content service provider, the business objective is keeping the users engaged and experiencing the content, whether the service is a paid subscription service or an advertiser-paid service like high definition (HD) radio or internet streaming. To the extent the user can experience a greater variety of content and content of highest personal interest, the value of the service is raised to that user. This results in a higher level of engagement and commitment from the user, with positive effects on the service provider's business.

The use of a conventional or traditional Electronic Program Guide (EPG) for providing current and upcoming content on multiple channels is available for television and radio broadcasting. The traditional provision of a visual EPG in a receiver is helpful, by providing a listing of content typically arranged in a grid of date/time along the x-axis and channels along the y-axis. Within the grid, information about each scheduled program is presented. Through User Interface (UI) controls provided by the receiver, the user can shift the display left and right to see programs at different times and up and down to see programs on different channels.

A traditional EPG UI is certainly a better means for finding interesting content than simply tuning and listening to or viewing each channel. However, the traditional EPG UI does not fully satisfy the needs described above, particularly in an environment like a vehicle where use and attention to the receiver UI must be minimized to maintain driver safety. Perusing the traditional EPG UI still requires significant attention from the user, making it impractical as a resource for a car driver or in any situation where the user does not have the time or patience to work with and navigate through the EPG.

Accordingly, there is a need for an improved apparatus and method that provides personalized content to a user by selectively enhancing enjoyment of the received SDARS or other broadcast content by recommending content according to content or broadcast affinity data and user preferences.

SUMMARY OF THE INVENTION

Exemplary embodiments of the present invention address at least the above problems and/or disadvantages and provide at least the advantages described below. Accordingly, an aspect of exemplary embodiments of the present invention is to provide a personalized content to a user by automatically and selectively enhancing the user's experience of received broadcast programming according to user preference and system affinity information (e.g., topic or channel affinities that can recommend more diverse content and channel discovery), as well as provide the user with tools for convenient and rapid content access and discovery.

It is another aspect of the present invention to provide an apparatus and method for informing the user of a personalized subset of the content (e.g., "highlights") currently playing across available channels.

According to one aspect of an exemplary embodiment of the present invention, there is provided an apparatus and method for informing the user of a personalized subset of the content (e.g., "highlights") scheduled for transmission or delivery at a future period of time.

Yet another aspect of an exemplary embodiment of the present invention is to provide an apparatus and method for informing the user listening to a given channel "A" of other channels that typically play content appealing to those who like channel "A". Similarly, another aspect of an exemplary embodiment of the present invention is to provide an apparatus and method for informing the user listening to a program on a given topic "A" of other programs or content that appeal to those who like content on topic "A".

According to one aspect of an exemplary embodiment of the present invention, a method of generating an enhanced electronic program guide (EPG) to broadcast programming, the broadcast programming being transmitted to a plurality of receivers and comprising various programs playing concurrently on a plurality of channels for selection and playback by the receivers, the EPG being available to all of the plurality of receivers and comprising a listing of programs transmitted on respective ones of the plurality of channels in the broadcast programming, the method comprising: receiving the broadcast programming; receiving and storing electronic program guide (EPG) data comprising a listing of programs transmitted on respective ones of the plurality of channels in the broadcast programming during at least a selected time frame; receiving and storing affinities data comprising at least one of cross-affinities among the plurality of channels in the broadcast programming, and cross-affinities among a group of topics that can be presented by the broadcast programming whereby the programs in the broadcast programming are each assigned at least one topic selected from the group of topics; generating user behavior data at the receiver comprising a history of the amount of time a user has listened to respective ones of the plurality of channels in the received broadcast programming over a designated period of time; determining a subset of the plurality of channels in the EPG to recommend to the user based on the user behavior data and the received affinities data; and generating an enhanced EPG output to the user that indicates the subset.

According to still another aspect of an exemplary embodiment of the present invention, the received affinities data comprises at least one of a listing of the plurality of channels and, for each listed channel, data representing a range of affinity strengths between the listed channel and some or all others of the plurality of channels, the range of affinity strengths corresponding to the degree to which, if a typical user likes a listed channel, the typical user likes the other channels. Further, received affinities data may comprise at least one of a listing of the group of topics and, for each listed topic, data representing a range of affinity strengths between the listed topic and some or all others of the group of topics, the range of affinity strengths corresponding to the degree to which, if a typical user likes a listed topic, the typical user likes the other topics.

According to still another aspect of an exemplary embodiment of the present invention, the method comprises generating user behavior data by determining temporal listening history of the user to build a profile of personal preference for program channels based on daily or weekly listening habits; and/or determining spatial listening history of the user to build a profile of personal preference for program channels based on listening location.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which:

FIGS. 3A and 3B depict an excerpt from an illustrative EPG Table or Program Schedule in accordance with an exemplary embodiment of the present invention.

FIGS. 4A and 4B depict respectively a Listening History Table and Personal Listening History data in accordance with an exemplary embodiment of the present invention.

FIG. 5 depicts a Programs Priorities List in accordance with an exemplary embodiment of the present invention.

FIG. 6 depicts a Personalized Affinities Table in accordance with an exemplary embodiment of the present invention.

FIG. 7 depicts a Suggestions List in accordance with an exemplary embodiment of the present invention.

FIG. 8 illustrates a receiver user interface (UI) in accordance with an exemplary embodiment of the present invention.

FIG. 9 illustrates a receiver user interface (UI) displaying an excerpt from an illustrative EPG Table or Program Schedule in accordance with an exemplary embodiment of the present invention.

FIG. 10 depicts Topics in accordance with an exemplary embodiment of the present invention.

FIGS. 11A and 11B depict a Topics Affinity Table in accordance with an exemplary embodiment of the present invention.

Throughout the drawings, the same drawing reference numerals will be understood to refer to the same elements, features, and structures.

DETAILED DESCRIPTION OF EXEMPLARY EMBODIMENTS

Figure 1:
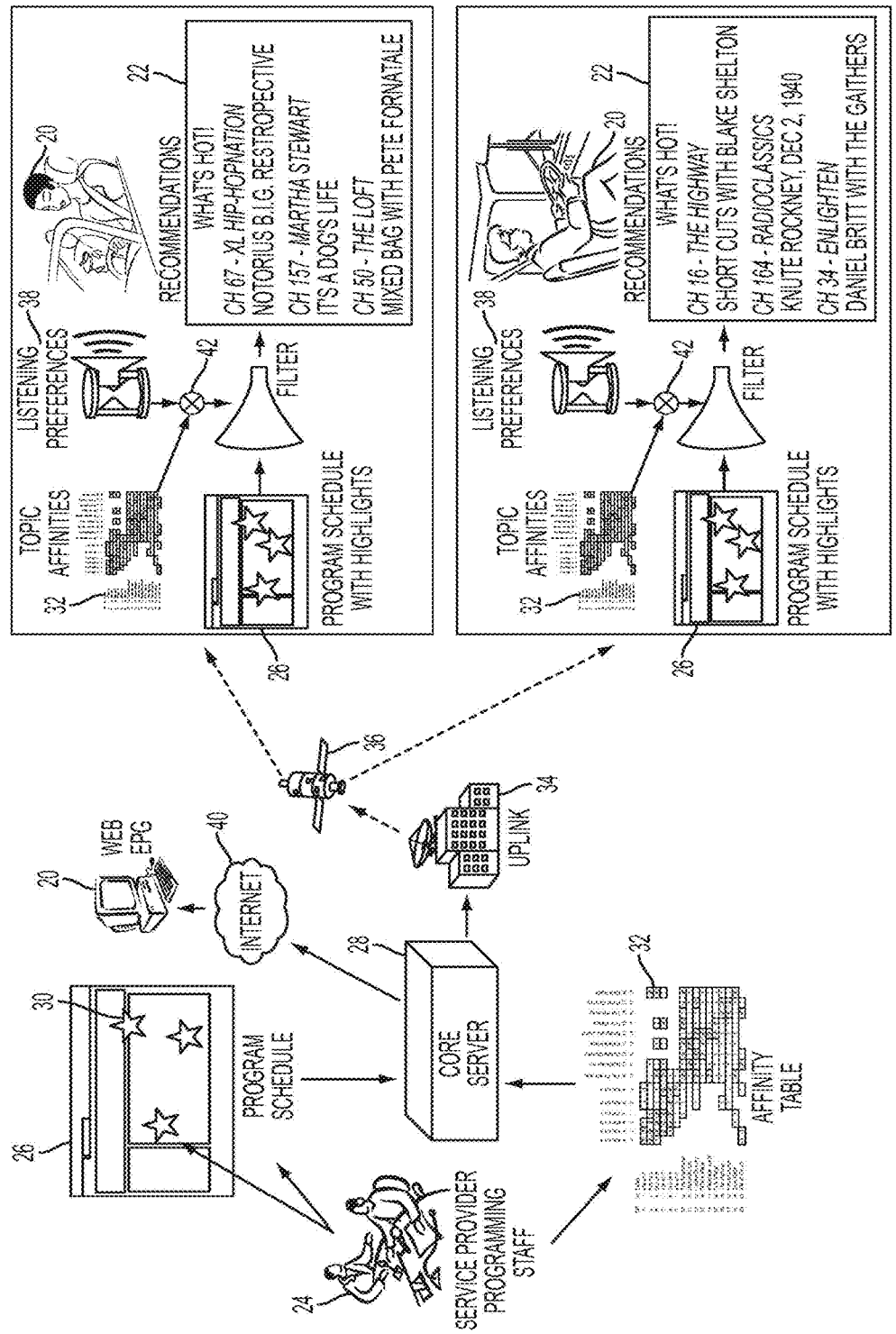
FIG. 1 depicts a diagram for implementing "What's Hot Now" in a device in accordance with an exemplary embodiment of the present invention.

The matters exemplified in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Furthermore, the terms used herein are defined according to the functions of exemplary embodiments of the present invention. Thus, the terms may vary depending on a user's or operator's intention and usage.

In accordance with an exemplary embodiment of the present invention, an apparatus and method are provided to inform a user of a broadcast stream, which has multiple, concurrently received channels of program content, about recommendations of a subset of the content currently playing across the available channels or to be played within a selected future time period. The subset of content is selected based on user preferences and system data (e.g., program topic and channel affinities among the broadcast content and channels) to recommend a more diverse subset of content than would be discovered if only user preferences were employed to make the selection of recommended content. As described in more detail below, global information assigned by a service provider in Program Highlights, and/or Program Topics, and/or Channel Affinities is combined with a specific user's Personal Behaviors to automatically calculate Personal Affinities. Personal Affinities are then used to automatically filter and prioritize the programs in an EPG. For example, highlighted programs in an EPG Table can be filtered using Personal Affinities such that a list of highlighted programs can be presented to each separate receiver user reflecting that user's likely content interests.

Personal Affinities are advantageous over listening preferences because a user's listening preferences alone are generally not sufficient to identify highlights or other programs that would be of interest to the user yet more diverse. Thus, using Personal Affinities in accordance with an exemplary embodiment of the present invention introduces more diverse content to the user that differs from content on channels already heavily used by the user. In other words, the use of Topic Affinities or Channel Affinities with a specific user's Personal Behaviors effectively projects the user's historical listening preferences onto new channels to facilitate the identification of new and interesting programs (e.g., program highlights). In addition, the use of Topic Affinities with a specific user's Personal Behaviors effectively identifies content of interest to the user by topic as well as takes into account that user's changes in topics of interest throughout the day and week (e.g., a user may prefer news topics on weekday mornings, certain talk shows during weekday afternoons, certain types of music in the evening, and certain sports programs on the weekends).

Exemplary embodiments of the present invention leverage and enhance a conventional EPG that is merely a channel guide to create a data resource for content discovery applications. Instead of a constant channel listing of all programs, wherein the burden is on a user to search the EPG channel listing and locate content of interest, an enhanced EPG method and apparatus in accordance with exemplary embodiments of the present invention provides a program listing that is a rich extension of data (e.g., SDARS program associated data and/or program descriptive text (PAD/PDT)) and receiver application software that uses this data to stimulate content discovery. Thus, the burden of content search and discovery is with the receiver software and automated and not on the user.

Exemplary embodiments of the present invention are described herein that provide at least the following main functions to solve the shortcomings of the conventional art stated above:

(1) Program Browsing—A function that provides user access to the full or a personalized subset of program listings (e.g. for a broadcast service), with the ability to set alerts for selected programs.

(2) "What's Hot Now"—A function that provides a user rapid access to a brief list of currently playing programs that is a personalized subset of the content (e.g., "highlights") currently playing across available channels. For Example, the highlighted content can be selected by the device based on global content attributes assigned by the content service provider (e.g., a programming staff member selects programs to be highlighted or featured and/or content or channel affinities), in combination with personalized listening preferences of the user.

(3) "What's Hot This Week"—A function that provides a user rapid access to a list of programs scheduled for delivery for the upcoming week or other period that is a personalized subset of the content ("highlights") scheduled for a future period of time. The highlighted content is selected by the device based on, for example, the user's selected topics of interest, listening habits and preferences, and standardized topic affinities. The user has the ability to set alerts for selected programs to be informed of when the programs are being broadcast.

(4) "Are there more shows like this one"—A function that assigns Topics metadata to programs. The Topics information is used by receivers to provide suggestions of similar programming that may be of interest to a user when combined with personalized listening preferences of the user.

(4) "More Like This Channel"—A function that informs the user listening to a given channel "A" of other channels that typically play content appealing to those who like channel "A".

These functions are described in more detail below. Although exemplary embodiments are described herein with reference to SDARS and, for example, to displaying and simplifying the navigation of an enhanced EPG of audio programming (e.g., on an SDARS receiver in a vehicle), it is to be understood that the exemplary embodiments of the present invention described herein can be used in connection with other content delivery services and to other types of media such as video programming or multimedia. Further, the delivery of the EPG in accordance with exemplary embodiments of the present invention can be via any of wired or wireless communication channels.

In accordance with an aspect of the present invention, an EPG service provides EPG broadcast data to user receivers (e.g., via continuous or intermittent transmission) that can include any of, but not limited to, the following data elements:

Program Schedule—For the upcoming week or other designated period, descriptions of programs scheduled for all audio channels, including program titles, text descriptions, channel number, start time/date, and duration. This data is updated by programming staff on a daily basis, for example, or more frequently if necessary.

Highlights and Features—Individual programs in the Program Schedule are designated as Highlighted or Featured (e.g., by programming staff) along with Program Schedule updates.

Topics—A hierarchical list of major topics and minor topics, assignable to each program in the Program Schedule. The topics list is updated relatively infrequently, with topic assignments to specific programs regularly updated along with Program Schedule updates by programming staff Topic Affinities—A Topic "Affinity" indicates whether a listener interested in one Topic might also be interested (or disinterested) in the other Topic For each Topic "x", a Topic Affinity Matrix is provided that includes a reference to each other Topic "y" indicating whether, if a listener likes Topic "x", she may also strongly like, somewhat like, or dislike Topic "y". This data need only be updated by programming staff infrequently.

Program Alert Messages—Text announcements used by programming staff, marketing staff and/or customer relationship management staff to highlight programming changes or special events.

Listener Profile Parameters—Data used to refine calculations or determinations made in the user receivers to derive personalized listener profiles. This data need only be updated infrequently.

The data elements above are used by software in the user receivers to implement user interfaces (UIs) such as the illustrative UIs described below. More specifically, the EPG service provides the EPG broadcast data or information as an infotainment service or data service (e.g., information transmitted over an SDARS data channel to an SDARS receiver). Software in the receiver interprets this data and presents it to the user through a user interface (UI).

Overview

FIG. 1 illustrates a system for implementing the above-described "What's Hot Now" function in a receiver according to an exemplary embodiment of the present invention. Operation of FIG. 1 will be described for illustrative purposes in connection with the flow chart in FIG. 2.

As stated above, the "What's Hot Now" function provides the user receiver 20 with simple access to a short list 22 of program suggestions that have been highlighted, for example, by programming staff of the content or service provider 24 and are prioritized based on the historical listening habits of the user and one or more system data affinities. This function emphasizes simplicity (e.g., access with a button press or two, and no user set-up required) and personalization (e.g., users with different listening histories may receive different lists of suggestions).

The exemplary embodiment of the present invention illustrated in FIG. 1 implements "What's Hot Now" processing using a few programs and channels as an example. Although the processing can involve multiple steps and calculations that are automatically performed by the receiver in accordance with software, for the listener it is very simple: press a button and get personalized suggestions or recommendations for content.

With reference to FIG. 1 and step 50 of FIG. 2, programming staff 24 enters full program data in an EPG Table or Program Schedule 26 which is described in more detail below in connection with FIG. 9. The EPG Table or Program Schedule 26 is stored in a server 28. During a preferably regularly repeated task, the programming staff also selects a number of programs to designate as Highlighted and/or Featured by tagging them in the Program Schedule database stored in the server 28 (steps 52, 54 and 56 in FIG. 2). For example, Highlighted and Featured programs are chosen based on their unique content, wide appeal to many users, or deep interest by some groups of the SDARS audience. The table in FIGS. 3A and 3B depict an excerpt of an illustrative EPG Table or Program Schedule 26 covering a few programs airing at the same time. The service provider flags, tags or otherwise marks the selected programs as "Highlighted" (e.g., as described below with regard to the section on Program Highlights). Such Highlight flags, for example, can be a part of the EPG Table, or a separate data element referencing the EPG Table. The EPG Table or Program Section and Highlights are stored by the service provider in the server 28, which may be a central server maintained by the service provider or a third party contracted by the service provider.

Figure 2:
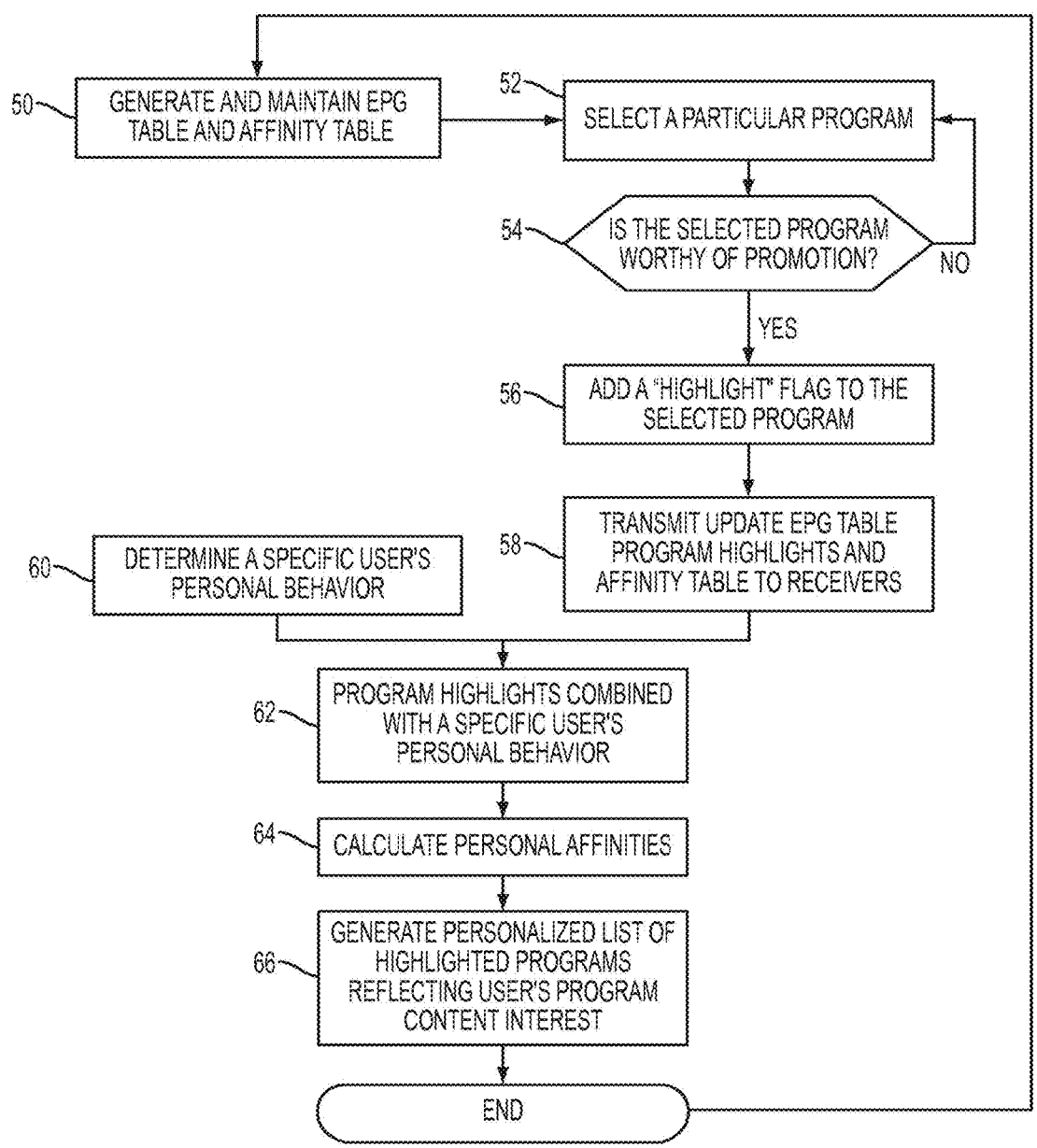
FIG. 2 depicts a flowchart illustrating calculating highlighted programs reflecting a user's program content interest in accordance with an exemplary embodiment of the present invention.

With continued reference to step 50 of FIG. 2 and to FIG. 3, the service provider programming staff 24 also associates one or more Topics with each program in the EPG Table or Program Schedule 26, characterizing the content of the program. Topics are described in more detail below in connection with FIG. 10. The programming staff also generate an Affinity Table 32 (e.g., a Topic Affinity Table) based on their expertise on positive and negative affinities between Topics. The values in the Affinity Table are not changed often, since they represent overall Topic affinities, not specific program affinities. For example, a Topic Affinity Table is described in more detail below in connection with FIGS. 11A and 11B, which represents an excerpt from the Affinity Table 32. The service provider can also generate a Channel Affinity Table (e.g., see FIG. 12) as described herein in the section Channel Affinities. The Channel and/or Topic and/or other Affinity data is also stored in the server or similar storage device.

With reference to FIG. 1 and step 58 of FIG. 2, the current week's EPG Program Schedule (with Highlights, Features, and Topic assignments indicated) and the Affinity Table are transmitted to all receivers 20 (e.g., via satellite and/or terrestrial repeaters as indicated generally at 34 and 36 or via the Internet as indicated at 40), where they are stored in a local memory of the receiver 20. Every receiver preferably receives the same Program Schedule and Affinity Table. Transmitting the EPG Table, Program Highlights, and Channel Affinities data to individual receivers is further described in the section Receiver Data Provisioning. This data can be conveyed to receivers periodically (e.g. daily updates) or continuously (e.g. continuous broadcasting, typical with a satellite radio system), for example.

Each receiver 20 collects one or more sets of data indicative of the receiver's user's personal listening preferences 38 as indicated at step 60 in FIG. 2 and as described in the section Personal Behaviors and maintains this data in local receiver memory. For example, each receiver 20 providing the "What's Hot Now" function monitors general listening behaviors of its user(s) to build, for example, a simple weighted table of relative time spent listening to each Topic, based on the Topics assigned to the Programs to which the user listens. An illustrative weighted table is shown in FIG. 4A based on the relative listening times shown in FIG. 4B. The longer bars in FIG. 4B represent Topics favored by the listener based on the relative listening time devoted to previously aired programs with those Topic assignments. The monitoring is preferably performed continuously, but can also be performed intermittently or for selected periods.

Through a UI function provided by the receiver, the user can request a list of highlighted programs currently playing or uses all or another subset of the playing programs. The receiver combines the stored Personal Behaviors data with Topic and/or Channel Affinity data as indicated at 42 in FIG. 1 and step 62 in FIG. 2 to build a prioritized list of channels most likely to include content of interest to the user, called the Personal Affinity List (see section Personal Affinities) as indicated at step 64 in FIG. 2. The receiver can use the Program Highlights data to build a list of all the channels that are currently playing highlighted programs, called the Highlighted Channel List, for example. The receiver sorts the Highlighted Channel List so the channels are listed in the same order as the Personal Affinity List. The receiver then displays information about the programs associated with the channels in the sorted Highlighted Channel List in the sorted order as indicated at step 66 in FIG. 2. The user may optionally scroll through the list to find something of interest, ultimately selecting a displayed program for immediate listening or simply exit the list back to the currently playing channel.

By way of an example, the weighted table or Listening History Table (e.g., FIG. 4A) is employed by the receiver software for prioritizing recommendations or suggestions as described below. The table is preferably not used outside the receiver to maintain strict privacy of the data. The algorithm for building the resulting Listening History Table, in calculating weighted channel or topic preferences, can reflect evolving listening habits by emphasizing Topics or Channels associated with more recently selected programs over those that have not been selected for a longer period of time.

A user wishing to obtain a list of suggestions for alternate programs currently playing can press a button on the receiver such as, for example, a soft button labeled On Now. The receiver software builds a Program Priorities List shown in FIG. 5 containing the programs from the EPG Program Schedule currently playing across all channels that can be sorted and prioritized with Highlighted programs at the top, followed by Featured programs, and then all other programs. This list is effectively a sorted version of the Program Schedule and the same for all receivers.

The receiver software next uses the user's Listening History Table (e.g., FIG. 4A) and the Topic Affinity Table 32, for example, to provide a prioritized list of all playing programs, called the Personalized Affinities Table as shown in FIG. 6. This processing step by the receiver augments the user's Listening History Table in FIG. 4A with the relatively static Topic affinities to "project" the user's dynamic listening habits onto programs airing on channels that he or she may not even be aware of. The table can be displayed, for example, with channels playing programs more likely to be of interest to this listener at the top.

Finally, the receiver software reorders the Program Priorities List (e.g., FIG. 5) using weightings from the Personalized Affinities Table (e.g., FIG. 6), creating a Suggestions List as shown in FIG. 7. The Suggestion List therefore reflects weighted program priorities based on:

program Highlights and Features established by programming staff in the Program Schedule, the user's personal and historical Topic preferences, and Topic affinities.

FIG. 7 illustrates the resulting Suggestions or Recommendations List that might be generated for the exemplary user. The original Feature and Highlight statuses can be shown for reference. This Suggestions List shows that the suggestions emphasize programs Highlighted and/or Featured by programming staff, while prioritizing programs most likely to appeal to this user and avoiding suggestions most likely to be inappropriate for this user. The incorporation of the Affinity Table information has resulted in program suggestions for channels never sampled by this listener, providing the advantage introducing the user to content and channels he or she may not be aware of or incorrectly assumed to not be of interest.

The receiver software can display the first few programs in the resulting Suggestion List, as shown in FIG. 8. As stated above, although the processing by the receiver software can be relatively complex, the user experience is simple: quick access to a personalized list of recommended programs playing right now.

A receiver 20 UI can allow a user to cycle through the list or, in a multi-line display, only show the first few suggestions as illustrated in FIG. 8. Receivers with limited display capability can present the suggestions through techniques such as temporarily populating a reserved bank of presets or favorites list with the channels playing the suggested programs, using a "scan" feature to preview the suggestions, or simply cycling through the suggestions with channel up/down while in the "What's Hot Now" mode of operation.

The receiver 20 may also allow the user to continue scrolling through additional program suggestions in the prioritized list. Although an important advantage of this function is to provide a few suggestions with minimal user interaction, the user may also use this feature to explore deeper into the list of suggestions.

Even though all receivers 20 use the same Program Schedule and Affinity Table data, the weighting influence of the Personalized Affinities Table (e.g. FIG. 6) can result in different suggestions for different listeners, thus providing a personalized experience.

What's Hot—Shared Elements

The data elements introduced above will now be described in more detail. These data elements may be used for both or either of the "What's Hot Now" and "What's Hot This Week" functions, among other functions.

EPG Table/Program Schedule

The service provider provides an EPG Table (e.g., a Program Schedule 26 for next week of content on the broadcast channels) to the receiver 20. The EPG Table lists current and/or future programming for a set of individual channels (e.g., see a receiver 20 UI display of an excerpt of an EPG Table in FIG. 9). The EPG Table can include Program Descriptive Information (metadata) about programs playing or scheduled to play at various time slots for a given channel including but not limited to any of: unique program identifier, program series or episode identifier (e.g., if program is part of a multi-program series), program title (e.g., long and short names to accommodate receivers with different display constraints), program short description, program long description, program series title, program series short description, program series long description, program categories, program subcategories, one or more topics and subtopics associated with the program, start time, duration, channel identifier, Feature/Highlight flags, content type flags (e.g., to indicate new content or live content or original airing or repeat airing or recording prohibited), repeat information (program is first-run, or a repeat of a previously aired program, or a number of times a program is repeated on a channel for the days covered by the Program Schedule transmission), program rating (e.g., suitability for younger audiences), program or series graphical logo, audio description of the program, video description of the program, and/or phonetic pronunciation information related to any of the Program Descriptive Information elements. The EPG Table may include program listings for all content played on all channels, for all content played on a subset of all channels, or for portions of the content played on selected or all channel. The time scope of the EPG Table may include only currently playing content or a range of time such as a day, week, month, etc.

The "What's Hot Now" and "What's Hot This Week" functions allow the service provider to draw the user's attention to interesting content for the day, week, or moment. The functions provide a way to efficiently use the potentially voluminous data of the Program Schedule with a very simple user interface, particularly in situations such as vehicle where driver distraction concerns are paramount or the user's capability to focus sustained attention to the EPG Table contents is limited.

Multiple access methods can be provided to access "What's Hot". For example, a "scan" mode can be provided to include optional "play for 10 seconds" while scanning a "What's Hot" list. Further, a soft or hard dedicated button can be provided on the receiver 20. A virtual category of "What's Hot" highlights is also an option. There can also be a dynamic "Favorites" list of "What's Hot" highlights optionally assigning a Preset Button to start a "What's Hot" list or scan to access to a "What's Hot" or "Favorites" list or "What's Hot" highlights.

In an illustrative embodiment, the Program Schedule 26 is continuously re-transmitted, carousel style, in four segments where each segment covers a specific time range:

Segment 0 contains current programming and approximately 3-4 hours of the most imminent programming.

Segment 1 contains a complete list of programming for the current day except for the programming contained in Segment 0.

Segment 2 contains a complete list of programming for the next day except for the programming that may be contained in Segment 0 during the period of time when Segment 0 overlaps into Tomorrow.

Segment 3 contains programming for the subsequent days covered by the schedule.

This segmentation allows the EPG service to provide fast access to current program information by transmitting Segment 0 more frequently than other Segments.

Message fields allow a receiver 20 to determine when the Program Schedule 26 has been completely received. Other fields allow a receiver to determine when the contents of the Program Schedule have changed. This avoids unnecessary processing if no changes have occurred since the last time the data was received and processed by the receiver.

The contents of the complete transmitted Program Schedule 26 can change at least once a day, eliminating the previous day's programs and adding a new day at the end of the 7 day span. However, schedule content updates typically occur multiple times during the day as program changes are made and additional details added for forthcoming programs.

Since the Program Schedule 26 is very dynamic and always transmitted in entirety, there is no starting "baseline database" compiled into a receiver at shipment.

Program Highlights and Features

The service provider 24 may mark a portion of the EPG Table programs as "Highlighted", based on their judgment of distinctive content, for example, programs that are unique and/or of potential high interest to listeners of varied background. In an illustrative implementation, two levels of highlighting are supported:

Highlight—A relatively small number of particularly distinctive programs, as might be highlighted in a weekly newsletter to listeners.

Feature—A relatively large number of programs across the entire week of content or other selected time period.

Together, Highlighted and Featured flags (e.g., see FIG. 3) provide a two tiered method for emphasizing selected programs. All Highlighted programs are also Featured. Therefore Highlighted=TRUE represents a higher emphasis on a program than only Featured=TRUE.

As an example for a broadcast service that supports about 150 channels, there could be at least 10 programs marked as Highlights at any point in time. The number of programs marked as Features would be enough that typical listeners with differing listening profiles could see at least 5 programs planned for the week that match their particular listening interests.

The service provider 24 can also highlight daily special events and/or real time events, for example a special impromptu interview.

Program Topics

Program Topics can be optionally assigned by the service provider 24 to identify the general type of content in a program. In one example, any program can be assigned a Topic (major topic) and Subtopic (minor topic) by the service provider. Examples might include:

Topic=Music, Subtopics=Alternative, Bluegrass, Blues, Jazz, etc.,

Topic=Business, Subtopics=Interviews, Finance, Management

Topic=Personal Interest, Subtopics=Health and Nutrition, Outdoors, Relationships, etc.

Additional examples are described below in connection with FIG. 10.

The advantage of using Topics is in identifying current and upcoming programs that match a user's selected interest areas, regardless of carrying channels, without the user having to peruse through all the content in the full Program Guide.

In accordance with another illustrative embodiment of the present invention, Topics provide a two-level hierarchical list of subject matter descriptions for characterizing programs in the Program Schedule. Major Topics are each further subdivided into Minor Topics as exemplified in FIG. 10.

Topic Definitions: Up to 1024 Topics can be defined by programming staff 24. Each defined Topic can be designated as either a Major Topic or a Minor Topic, for example, with the constraint of a maximum of 256 Major Topics and a maximum of 256 Minor Topics assigned to any single Major Topic. Each Minor Topic belongs to a single Major Topic. Each Topic is assigned a text name of up to 32 displayable characters. The Topics definition list is continuously broadcast, carousel style, as part of the EPG service.

Topic Program Associations: The EPG transmission includes associations of Topics to selected programs in the Program Schedule. Each program can be associated by programming staff 24 with up to 8 Topics, for example. Although not explicitly required, Programs are most often tagged with Minor Topics since the Minor Topics provide more specificity than Major Topics, which can be important for classifying program content.

Topic Affinities

The EPG transmission indicated at 36 and 40 in FIG. 1 preferably comprises an Affinity Table 32 such as a Topic Affinity Table (e.g., FIGS. 11A and 11B), indicating potential "like" and "dislike" relationships between each Topic pair. For each Topic "x", the Affinity Table indicates one of the following affinities for each other Topic "y" defined by programming staff:

Typically Likes (2)—A listener who likes Topic "x" will typically also like Topic "y".

May Like (1)—A listener who likes Topic "x" may also like Topic "y".

Neutral (0)—No strong negative or positive affinity between Topic "x" and Topic "y".

Typically Dislikes (−1)—A listener who likes Topic "x" will typically dislike Topic "y".

The resulting Topic Affinity Table can be viewed as a matrix, with Topic identifiers on the x and y axes and intersecting cells indicating the affinities between Topic pairs using a numerical code. FIGS. 11A and 11B illustrate an excerpt of an exemplary Topic Affinity Table, covering a few example Topics. The four values 2, 1, 0, and −1 each represent the four affinities described above. FIGS. 11A and 11B illustrate Topics which have symmetric relationships (Topic "x" to Topic "y" is the same as Topic "y" to Topic "x"). However, the EPG service in accordance with an exemplary embodiment of the present invention also accommodates asymmetric relationships, e.g., Topic "x" to Topic "y" is different from Topic "y" to Topic "x". This data can be transmitted continuously, for example, as part of the EPG transmission in a compressed format.

Topic affinities are established by programming staff 24 as a tool for use by receivers 20 in filtering and prioritizing program suggestions to individual users. These affinities are not absolutes since there is a wide variation in personal preferences for content; however, they provide a useful element in algorithms used by the receiver to prioritize content suggestions to the user, and to de-prioritize suggestions that a user might find inappropriate. The Topic Affinity Table values preferably need only be updated infrequently such as usually only when adding or removing Topics, or for fine-tuning the algorithms used to suggest programming alternatives to the user.

Channel Affinities

Figure 12:
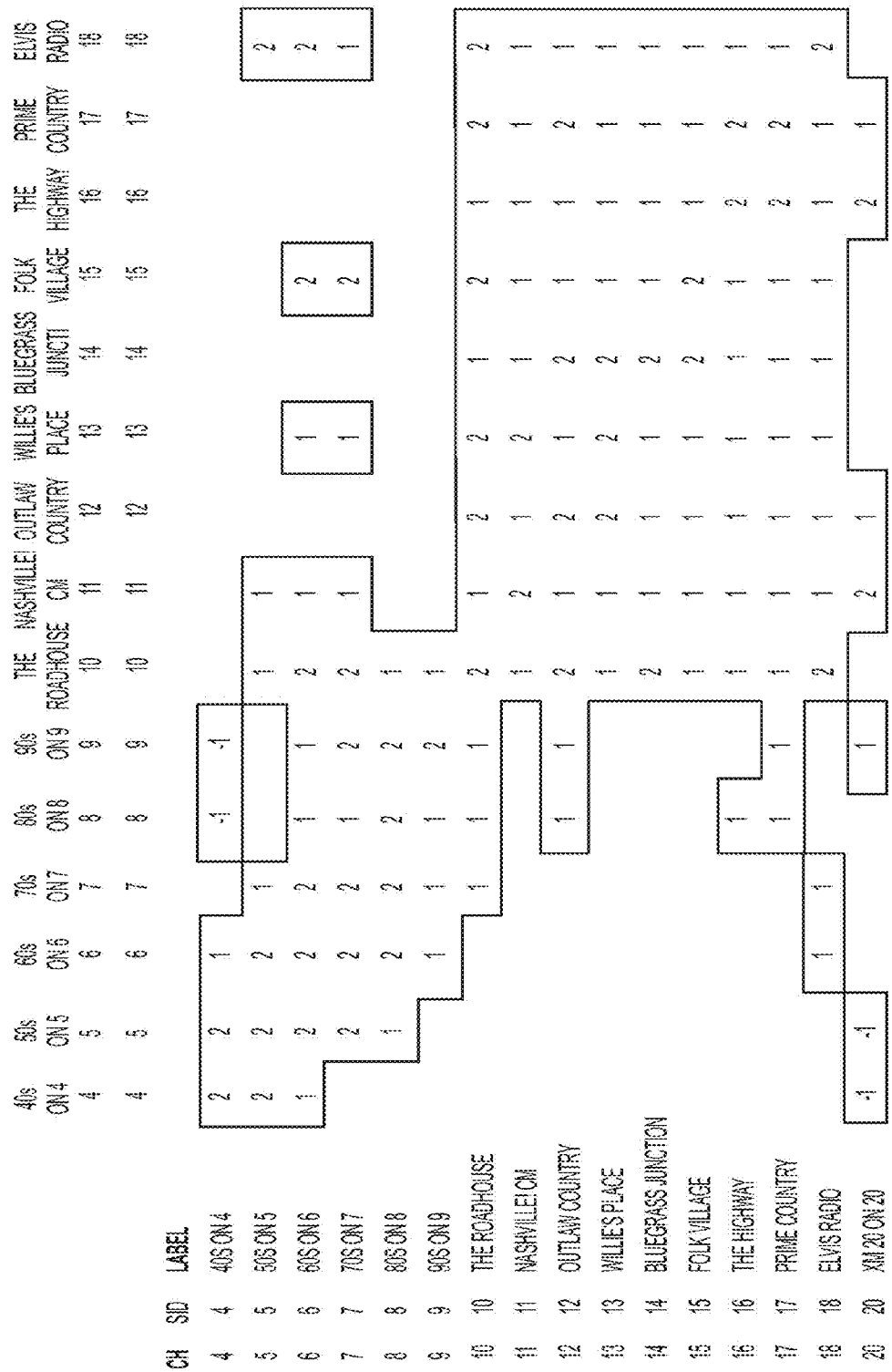
FIG. 12 depicts a Channel Affinity Table in accordance with an exemplary embodiment of the present invention.

FIG. 12 is an excerpt of a matrix of a Channel Affinity data according to an exemplary embodiment of the present invention. The Channel Affinity data reflects the service provider's judgment or determinations regarding a typical listener's cross-affinities to channels. This data effectively indicates that a listener who likes channel A will likely also like channel B and C (strong affinity), may like channel D (medium affinity), probably would dislike channel E (negative affinity), and would have an unknown/neutral opinion about other channels (neutral affinity). This is relatively static information that would only need to be updated by the service provider 24 from time to time (e.g., upon addition of a new channel, significant change in channel content, or to fine-tune the affinities). Channel Affinity data is global, meaning it is intended for use by all receivers. Alternatively, different Channel Affinity data can be provided to groups of users distinguished by some differentiating demographic characteristics. Channel Affinity data can be based on content genre or type and other metadata parameters, user listening behavior or other feedback information, and so on.

Referring to FIG. 12, the Channel Affinity data is maintained and provided, for example, as a matrix, with all channels listed on both the x and y axis and values listed to indicate strength of affinities between respective channels. A value is entered at each cell of the matrix to indicate the affinity of the channel pair that intersects at that cell. Affinity values in each cell can indicate a range of positive affinity strength (if you like channel A, you will really like channel B), a range of negative affinity strength (if you like channel A, you will really dislike channel B), or neutral (no consistent positive or negative affinity between channel A and B).

Channel Affinity data is preferably determined and provided for any and all users (e.g., without distinction by demographics). Channel Affinity data is used to project each user's personal behavior onto all available channels to enrich suggestions of content for that user as described in more detail in connection with FIGS. 2 and 16. Thus, using Channel Affinity data is valuable and useful even if, for example, (a) the programs are not marked as to content type, or (b) the data is not delivered to groups of users based on demographics. The Channel Affinity data can simply reflect channel-to-channel affinities, versus program affinities, to achieve a simple yet powerful approach to facilitating users' discovery of content among a diverse and rich content source.

Personal Behaviors

Personal Behaviors function employs one or more attributes to identify and extrapolate the personal listening behaviors of the user, and can include without limit at least any of the following:

Channel Listening History—This Personal Behavior attribute includes the relative time spent by a user listening to specific channels or programs as well as absolute times. More critical than absolute times are the relative times: i.e. channel A was listened to 10 times more than channel B, channel C was never listened to at all, etc. The user's personal listening history is automatically tracked by a receiver 20 without any user setup.

Channel Preset and/or Favorites Selections—This Personal Behavior attribute includes user actions of assigning a channel to a receiver preset or "favorites" list. The implication of this action is that the user has some interest in the assigned channel such that these user selections are useful for aspects of the present invention involving personalization.

Channel Suppression Selections—If the receiver 20 supports the ability to suppress a channel choice (e.g. to skip over it when tuning, to suppress it for play by younger audiences), such selections can imply that the user is disinterested in the suppressed channel, which are also useful for aspects of the present invention involving personalization.

Temporal Listening History—This Personal Behavior attribute combines Channel Listening History with time of day and/or day of week, to build a profile of personal preferences for channels based on daily or weekly listening habits. For example, a user may like to listen to news during a morning commute, but prefer music driving home at the end of the day.

Spatial Listening History—This Personal Behavior attribute combines Channel Listening History with location information, to build a profile of personal preferences for channels based on listening location, stationary (e.g., office, home, etc.) or in motion (e.g., work commute route vs. other routes using mobile receiver position determination technology). In other words, a user may like to listen to news while commuting to work, but prefer music when driving other routes not matching the typical commute route.

Program Listening History—This Personal Behavior attribute is similar to Channel Listening History, except that it captures more refined information about specific programs the user has listened to.

Personal Behaviors (e.g., personal listening history) are preferably automatically tracked by the listener's receiver 20 and without requiring user set-up or requiring user operations to control personal behavior tracking.

Personal Affinities

As described above in connection with FIGS. 1 and 2, an exemplary embodiment of the present invention combines the global information assigned by the service provider in Program Highlights, and/or Program Topics, and/or Channel Affinities with a specific user's Personal Behaviors to calculate Personal Affinities. Personal Affinities are then used to filter and prioritize the programs in the EPG Table 26 (e.g., Highlighted or Featured programs) such that a list of highlighted programs can be presented to each separate receiver user reflecting that user's likely content interests. Personal Affinities are advantageous over merely using listening preferences to locate and suggest content of interest because a user's listening preferences alone are generally not sufficient to identify highlights that would be of interest to the user yet also more diverse (i.e., that would introduce more diverse content that differs from content on channels already heavily used by the user). In another words, the use of Channel and/or Topic Affinities with a specific user's Personal Behaviors effectively projects the user's historical listening preferences onto new channels to facilitate the identification of new and interesting program highlights.

The Personal Behavior components of Personal Affinities serve to properly prioritize a program list such as a Highlights list so that programs matching the user's interests appear at the top of the list, and programs that clash with the user's interests appear at the bottom of the list or are suppressed from the list altogether. The Channel and/or Topic Affinities components of Personal Affinities serve to extrapolate the user's Personal Behaviors to content played on channels the user may have never even tuned to. Without the Channel or Topic Affinities element in the calculations, Personal Behaviors might only prioritize program highlights on channels the user is already familiar with, limiting the ability to enhance user discovery of broadcast content. In effect, the Channel Affinities or Topic Affinities project a user's Personal Behaviors onto all available channels to enrich the highlighted program suggestions, and therefore is a significant advantage of the present invention.

In accordance with exemplary embodiments of the present invention, Personal Affinity calculations or determinations can be implemented using, but not limited to, any one or combination of the following:
1. Simple weighted sums of relative listening times (Channel Listening History) applied to Channel and/or Topic or and/other Affinity values.
2. Non-linear weighting of relative listening times (Channel Listening History) applied to Channel and/or Topic and/or other Affinity values.
3. Linear or Non-linear Weighting incorporating channels assigned to presets or favorites (e.g. higher weights for channels assigned by the user to a preset or favorite)
4. Linear or Non-linear Weighting incorporating suppressed channels or topics (e.g. negative weighting for channels or topics suppressed by the user.)
5. Time-variant elements of the weighting (e.g. where the influence of channels or topics listened to a long time ago, or preset assignments made long ago has a weaker influence on channels or topics most recently listened to and/or preset assignments most recently made).

Multiple sets of Personal Behavior and Personal Affinity data can optionally be stored in a single receiver 20, to accommodate multiple users or sets of users of the receiver. For example, for a receiver installed in a car, the key fob could indicate to the system which person in a family is driving the car and therefore load and maintain the Personal Behavior and Personal Affinity data for that user. Additionally a receiver 20 can offer the option for the user to explicitly select a user profile, for example, to determine if Personal Behavior and Personal Affinity data should be loaded and maintained for a parent driving alone, versus the same parent driving with their young children in the car.

Receiver Data Provisioning

Multiple methods can be employed to get any of the EPG Table data, Channel Affinity data, and/or Program Topics assignments from the service provider to individual receivers, including but not limited to:
  Broadcast (e.g., over a data channel) through a broadcast network such as satellite radio or HD radio using wired or wireless transmission means.
  Internet-based or private network based distribution including:
  Side-loaded by connecting the receiver to a PC connected to the internet
  Cellular connection
  WiFi connection What's Hot Now The "What's Hot Now" function allows a content provider to bring special events for the day, week or current time to its users' or customers' attention to highlight special programming, promote vast and diverse content to users and otherwise facilitate their discovery of different content. By way of an example, the "What's Hot Now" function can provide a short list of interesting programs currently being delivered by the content provider that can be a tool for a listener tiring of his presets and looking for some new and interested content. This list can prioritize currently playing programs highlighted as Features and Suggestions, and further prioritized (e.g., ordered on the user receiver screen) by the user's Personal Affinities. By selecting any entry on the displayed list, the user can jump to and tune to that program immediately. Additionally, the list can filter out highlights likely to be of negative interest to the user based on the user's Personal Affinities. Thus, user interface navigation is simple and driver distraction concerns are minimized.

Through a UI function provided by the receiver 20, the user requests a list of highlighted programs currently playing. A number of methods may be used by the receiver for presenting the programs in the sorted Highlighted Channel List, including but not limited to:
  Show only the top few highlighted programs on a single screen
  Show only a single program, one at time on a screen with limited display area
  Allow scrolling of the list forwards and backwards
  Automatically populate a separate "What's Hot Now" list that the user can navigate (similar to a "Favorites" list used with some existing satellite radio receivers)
  Automatically populate a bank of channel presets with the top highlighted channels from the list, either on a temporary basis (e.g. assigned only while the user is perusing the current "What's Hot" channels), or on a lasting basis (e.g. assigned to previously unassigned presets until the user changes them).
  Use a receiver's "Scan" or "Seek" function to jump from highlighted channel to highlighted channel, optionally playing a short segment from the channels as it passes through the list.
  Use a speech processing system to describe the list of highlighted programs.

Provide additional UI functions to obtain more information about a highlighted program, including display of the associated information from the EPG Table for the program as described in the section EPG Table.

Use a hard or soft dedicated button.

Use a virtual category of "What's Hot" highlights.

Use a dynamic "Favorites" list of "What's Hot" highlights.

Use an optionally assigned Preset Button to start a "What's Hot" list or scan.

Since the receiver 20 displays the highlighted list in a sort order influenced by the user's Personal Behaviors, two users may each see a different list (particularly the top selections), even though the Program Highlights delivered to each user's receiver are the same. In this way, the lists are customized for each user's listening preferences and therefore much more likely to highlight programs of interest. This key feature in exemplary embodiments of the present invention allows the user to easily find a currently playing program that is of interest to them.

Since the receiver focuses on showing a relatively short list of personally prioritized highlighted programs (instead of perusing an entire EPG Table list or even all highlighted programs), concerns about driver distraction and heavy UI interaction burdens are mitigated.

What's Hot this Week

The "What's Hot This Week" function implementation is similar to the implementation for the "What's Hot Now" function, except the scope of highlighted program display extends beyond currently playing programs through a future time period, such as multiple hours, a day, a week, or longer. For example, the "What's Hot This Week" function assists a user in locating programs of interest in an upcoming week or other time interval. As described above, a dynamic, hierarchical "Topic List' can be defined by a content or service provider 24 that is more granular than current program categories. The service provider 24 uses the EPG Table 26 and tags selected programs with one or more Topics and, if any, Subtopics. User devices 20 (e.g., a listener's SDARS receiver) receive the Topics List as part of the EPG, for example. A user reviews the Topics List and creates a Topics/Subtopics Favorites List that is used by the receiver such that, when "What's Hot This Week" is selected, the user is presented with a prioritized list of highlighted programs matching his Topics/Subtopics Favorites List. A user can set up alerts when selecting programs from weekly highlights so that, for example, when the user is driving, he is alerted to when the selected highlight is about to be broadcast or otherwise delivered.

More specifically, the receiver makes use of the Program Topics described in section Program Topics. Program Topics are established by the service provider 24 and can be conveyed to the receiver 20 using the same storage and conveyance methods previously described for the EPG Table 26.

Once the receiver 20 has stored the Program Topics, it uses the Topics (and optional Subtopics) to build a hierarchical list of available Topics/Subtopics. This list is presented to the user as part of a device personalization UI. The user may choose any number of Topics/Subtopics as "favorites", with his or her choices stored in the receiver local memory as a Favorite Topics List.

Through a UI function provided by the receiver 20, the user requests a list of upcoming programs. The time scope may be fixed by the duration coverage of the EPG Table 26, or selectable by the user. The receiver 20 uses the Favorite Topics List with the Program Topics assigned to individual programs in the EPG Table to generate a list of programs most likely to be of interest to the user. Optionally, this list can be further prioritized (sorted) using the same use of Personal Behaviors data as described in Personal Affinities and for the "What's Hot Now" method. The result is a sorted Highlighted Program List, displayed by the receiver UI with information about program start time and date, channel, title, etc. The user can optionally scroll through the list to find something of interest.

The receiver 20 can optionally provide an Alert function, whereby the receiver adds a selected upcoming program to an Alert List. Later, if the user is listening to the receiver 20 when the program begins (or turns on the receiver while the program is in progress), the receiver UI would present a notification that the program is starting or in progress, giving the user the option to tune to the program.

The receiver 20 can optionally provide a Schedule Recording function, whereby the receiver will automatically record the program when it begins in the future.

A number of methods can be used by the receiver 20 for presenting the programs in the sorted Highlighted Program List, including but not limited to:

Show highlighted programs by Topic/Subtopic

Show highlighted programs by start date/time

Show highlighted programs sorted by likely interest, as determined through Personal Affinities Allow scrolling of the list forwards and backwards Use a speech processing system to describe the list of highlighted programs Provide additional UI functions to obtain more information about a highlighted program, including display of the associated information from the EPG Table for the program as described in the section EPG Table.

Since the receiver 20 displays the highlighted list in a sort order influenced by the user's selection of favorite Topics/Subtopics, two users may each see a different list (particularly the top selections), even though the Program Highlights and Program Topics delivered to each user's receiver 20 are the same. In this way, the lists are customized for each user's listening preferences and therefore much more likely to highlight programs of interest. This key feature in exemplary embodiments of the present invention allows the user to easily find a currently playing program that is of interest to them.

Since the receiver 20 focuses on showing a relatively short list of upcoming programs personally prioritized for each user (instead of perusing an entire EPG Table or even all highlighted programs), concerns about driver distraction and heavy UI interaction burdens are mitigated.

What's on this Channel

In accordance with another embodiment of the present invention, this function provides channel information from the service provider 24 to the receivers 20, including at least any of, but not limited to, the following:

Channel Name

Channel Category

Channel Brief Description

Channel Long Description

Type of Content

Topics/Subtopics commonly appearing on the channel

Typical Artists Played

Typical Genres Played

Audio file of spoken description and/or sample content

Video file of spoken description and/or sample content

The information is generated by the service provider and can be conveyed to receivers using, for example, any of the methods described above in the section Receiver Data Provisioning.

When the user is listening to a channel or viewing a channel selection in the list, he or she invokes a UI function provided by the receiver 20 to obtain more information about the channel. Any of the additional channel information listed above can be presented to the user. A combination of channel description can be provided such as tagline or full description, genres played, typical artists played and so on. This function in exemplary embodiments of the present invention allows the user to easily determine what kind of content is played on a given program channel and also identify other similar program channels.

More Like this Channel

This function uses the Channel Affinity data described in the section Channel Affinities. The Channel Affinity data is composed by the service provider 24 and conveyed to the receivers 20.

The receiver UI offers a "More Like This" function invoked by the user while listening to any channel. When invoked, the receiver 20 displays a list of other channels with high affinity to the current channel based on the stored Channel Affinity data, sorted by affinity strength (high to low). Optionally, the channel list may be sorted based on the methods described in the section Personal Affinities.

A number of methods may be used by the receiver for presenting the channel list, including at least any, but not limited to, the following:

Show only the top few channels with strongest affinity to the current channel.
Show only a single channel, one at time on a screen with limited display area
Allow scrolling of the list forwards and backwards
Automatically populate a separate "More Like This" list that the user can navigate (similar to a "Favorites" list used with some typical satellite radio receivers)
Use a receiver's "Scan" or "Seek" function to jump from highlighted channel to highlighted channel
Automatically populate a bank of channel Presets with the top affinity channels from the list, or optionally assign a Preset button to start a "More Like This" list or scan operation.
Use a speech system to describe the list of highlighted channels
Provide additional UI functions to obtain more information about a highlighted channel, including display of the channel information described in section What's On This Channel, and/or display of currently playing programs on the channel from the EPG Table for the program as described in the section EPG Table.
Employ a Virtual Category of channels with high affinity to current channel.

Exemplary Algorithms for Determining Personal Affinity Lists

Figure 13:
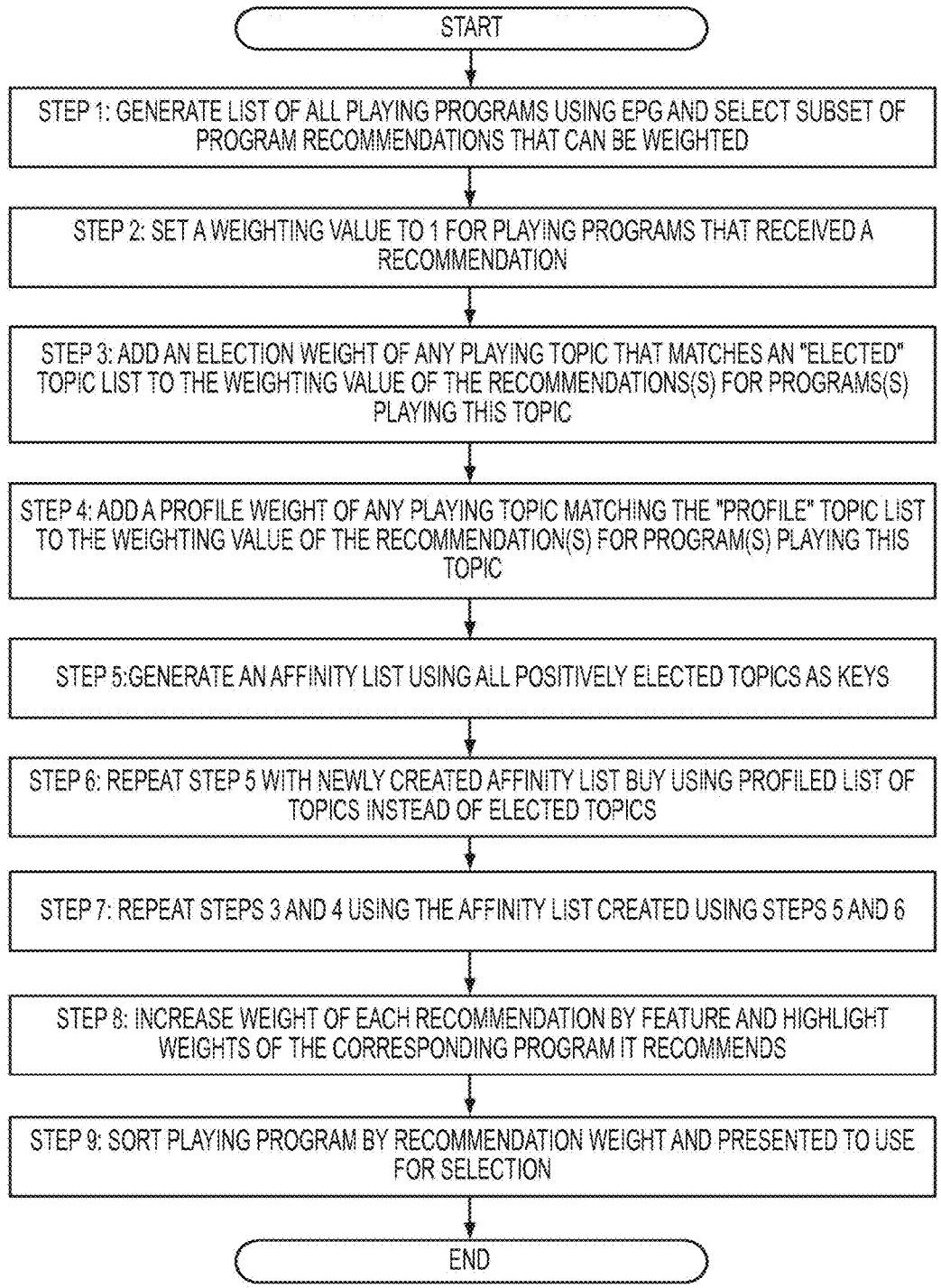
FIG. 13 is an illustrative algorithm for creating an Affinity list based on Personal Behaviors in accordance with an embodiment of the present invention.

FIG. 13 is an illustrative algorithm for creating an Affinity list based on Personal Behaviors in accordance with an exemplary embodiment of the present invention.

A list of all playing programs is generated as an EPG table or Program Schedule, and a subset of programs are selected as recommendations that can be weighted (Step 1). A weighting value is then set to 1 for playing programs that received a recommendation (Step 2).

An election weight of any playing topic that matches an "Elected" topic list is added to the weighting value of the recommendation(s) for program(s) playing this topic (Step 3). For example, Topics from the Channel Presets have an election weight of 1. Topics purposely chosen by the user have an election weight of 2.

With continued reference to FIG. 13, a profile weight of any playing topic matching the "Profiled" topic list is added to the weighting value of the recommendation(s) for program(s) playing this topic (Step 4). For example, profile weights are based on listening time. A non-linear function can be used to create profile weights 1-9.

An Affinity list is generated using all positively Elected topics as keys (Step 5). For example, the weight given to each Affinity topic is the Affinity value. Affinity topics already in the Elected or Profiled list are discarded. Negative affinity topics that are profiled or elected are changed to positive. Negative affinity topics make the cumulative playing program weight negative if the program recommendation weight is 1. The Elected List is then replaced by the newly created affinity list.

With reference to FIG. 13, Step 5 is repeated but applied to the Profiled list of topics (Step 6).

Steps 3 and 4 are repeated using the Affinity list created in steps 5 and 6 (Step 7).

The weight of each recommendation is increased by Feature and Highlight weights of the program it recommends (Step 8). For example, a value of 200 is added for Featured programs, which moves them up the list in a sort done in Step 9. A value of 400 is added for Highlighted programs, which moves them up the list in a sort done in Step 9. Programs with a recommendation weight of one are skipped in this step.

The playing program list is now sorted by recommendation weight and presented for selection (Step 9).

Figure 14:
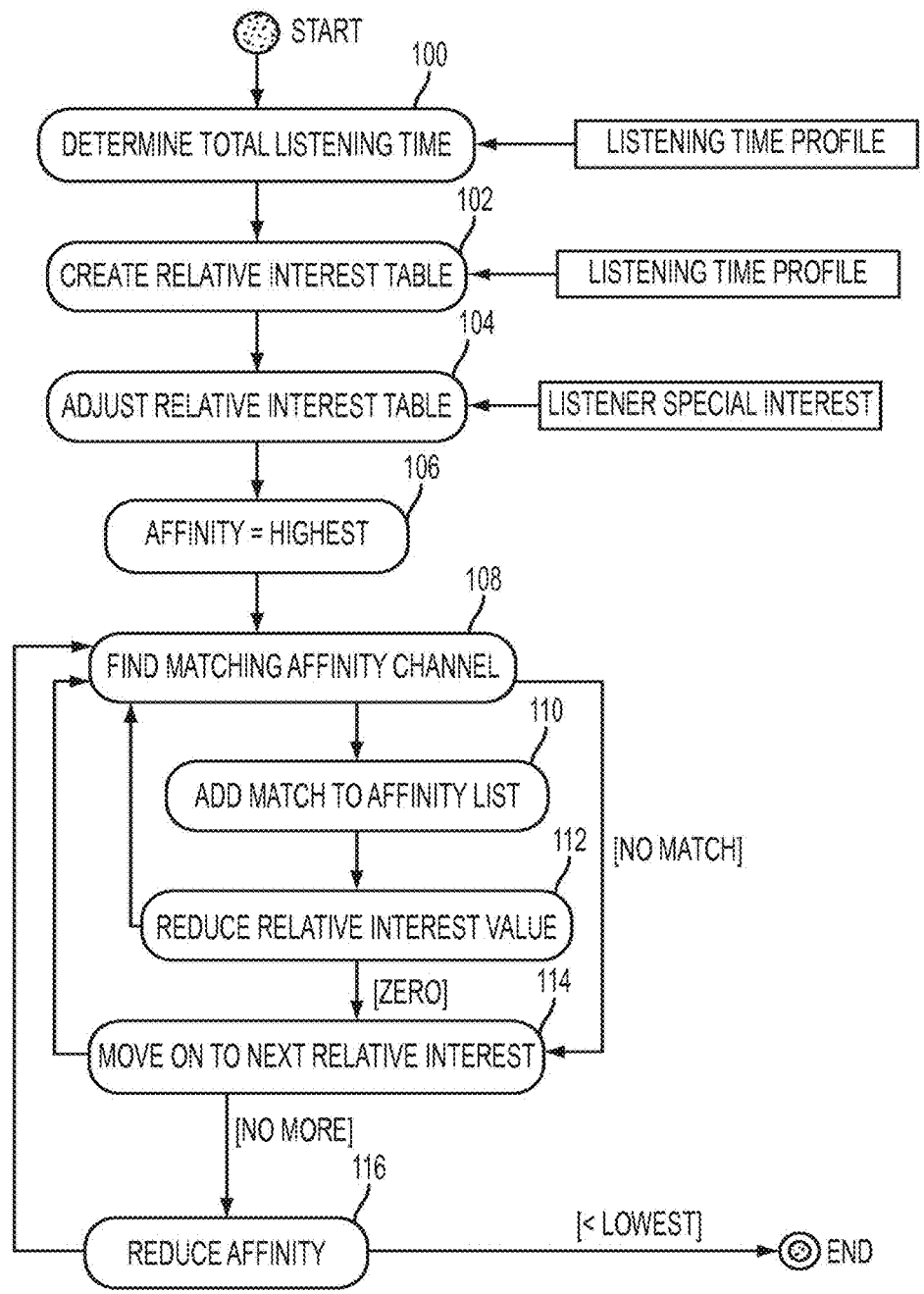
FIG. 14 is another illustrative algorithm for creating an Affinity list based on Personal Behaviors in accordance with an embodiment of the present invention.

FIG. 14 is another illustrative algorithm for creating an Affinity list based on Personal Behaviors in accordance with an embodiment of the present invention.

The first step in FIG. 14 utilizes a Listening Time Profile of a particular user to determine the total listening time of the user. For example, a channel listening times (e.g., Channel Listening History attribute, Temporal Listening History Attribute described above) that is greater than a selected interest threshold can be used (see 100 in FIG. 14). A Relative Interest Table can then be created using the Listening Time Profile of the user (e.g., channels most often listened to by the user) as indicated at 102.

With reference to 104 in FIG. 14, the Relative Interest Table is adjusted. For example, the relative interest can be a number from 1-10 assigned to channels listened to by the user. A Listener Special Interest can then be used in the adjustment (e.g., a positive relative interest influence from a defined application such as Preset Channel selections, or a negative relative interest influence from a defined application such as Channel Skip or Delete selections). The adjustment for special interest allows for the addition of 1, for example, such that the full range is 1-11. As indicated at 106 in FIG. 14, the Affinity calculation considers the channel(s) assigned the highest numbers in the range 1-11, for example, for inclusion and highest ranking(s) in the Affinity List.

With reference to 108 in FIG. 14, information from the Channel Affinity Table (e.g., FIG. 16) is used to find a matching affinity channel initially for the channel in the user's Affinity List having the highest affinity, for example. If a matching affinity channel is found, it is added into the user's Affinity List (see 110 in FIG. 14). The Relative Interest Value is then reduced as indicated at 112. This process is repeated until all matching affinity channels are located for that particular entry in the Affinity List.

If there is no matching affinity channel for the channel of interest in the Affinity List, then the algorithm moves to the next channel of relative interest in the user's Affinity List and determines whether or not a matching affinity channel exists for that channel as indicated at 114. If so, the receiver 20 adds that matching affinity channel and reduces the Relative Interest Value and repeats the process until all matching affinity channels are located for that particular entry in the Affinity List.

Figure 16:
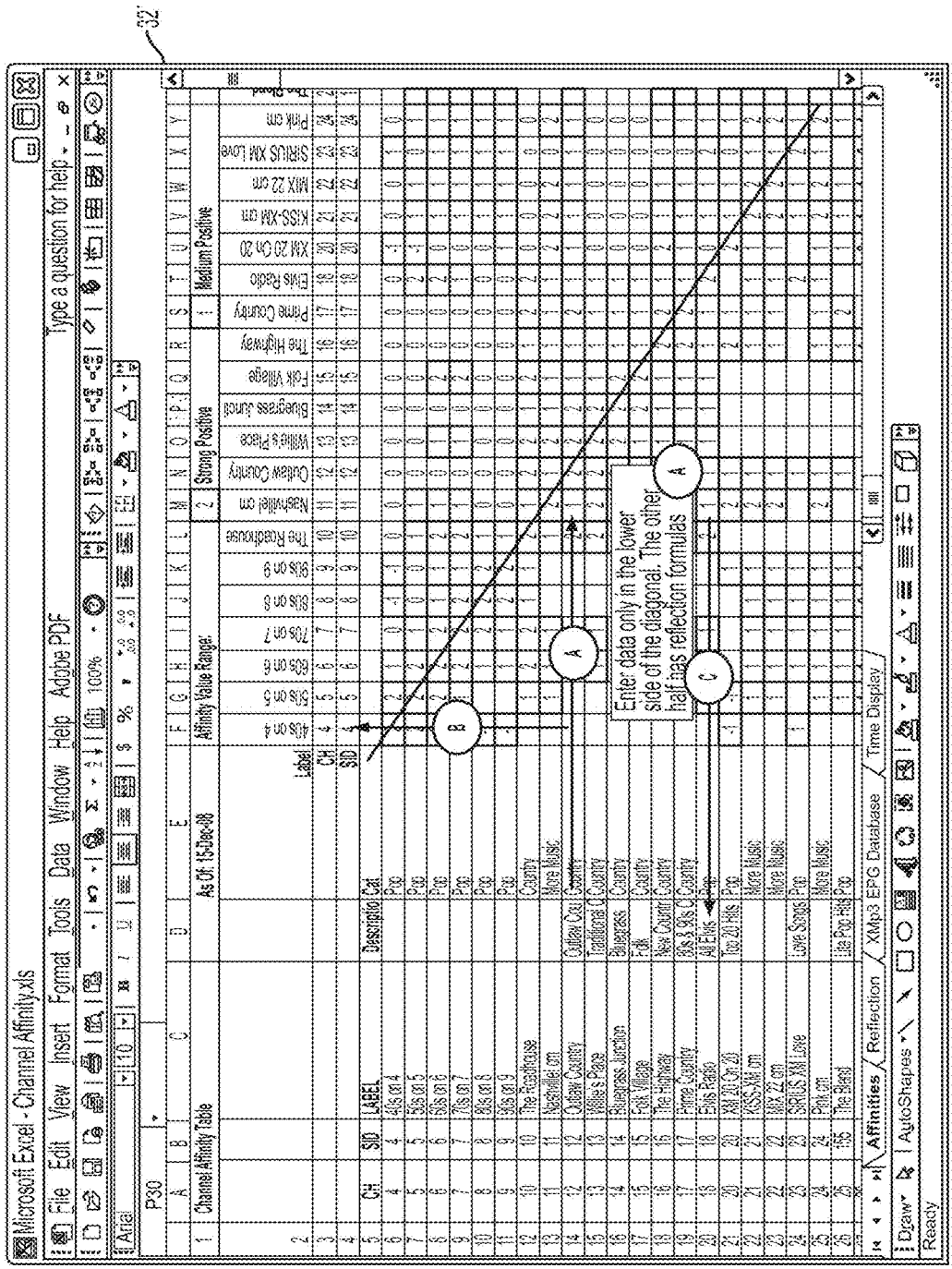
FIG. 16 depicts a detailed matrix of Channel Affinity data in accordance with an exemplary embodiment of the present invention.

Once all channels having a selected relative interest have been processed to determine if a matching affinity channel exists, the channel(s) ranked with the next lowest affinity are then processed as described above to determine if matching affinity channels exist and to reduce relative interest values as needed as indicated at 116. As indicated in FIG. 16, the affinity values can be 2, 1, 0, −1, for example, in ranking from highest to lowest affinity relative to other channels. The algorithm ends once it is determined whether or not the channel of lowest affinity has a matching affinity channel(s).

Figure 15:
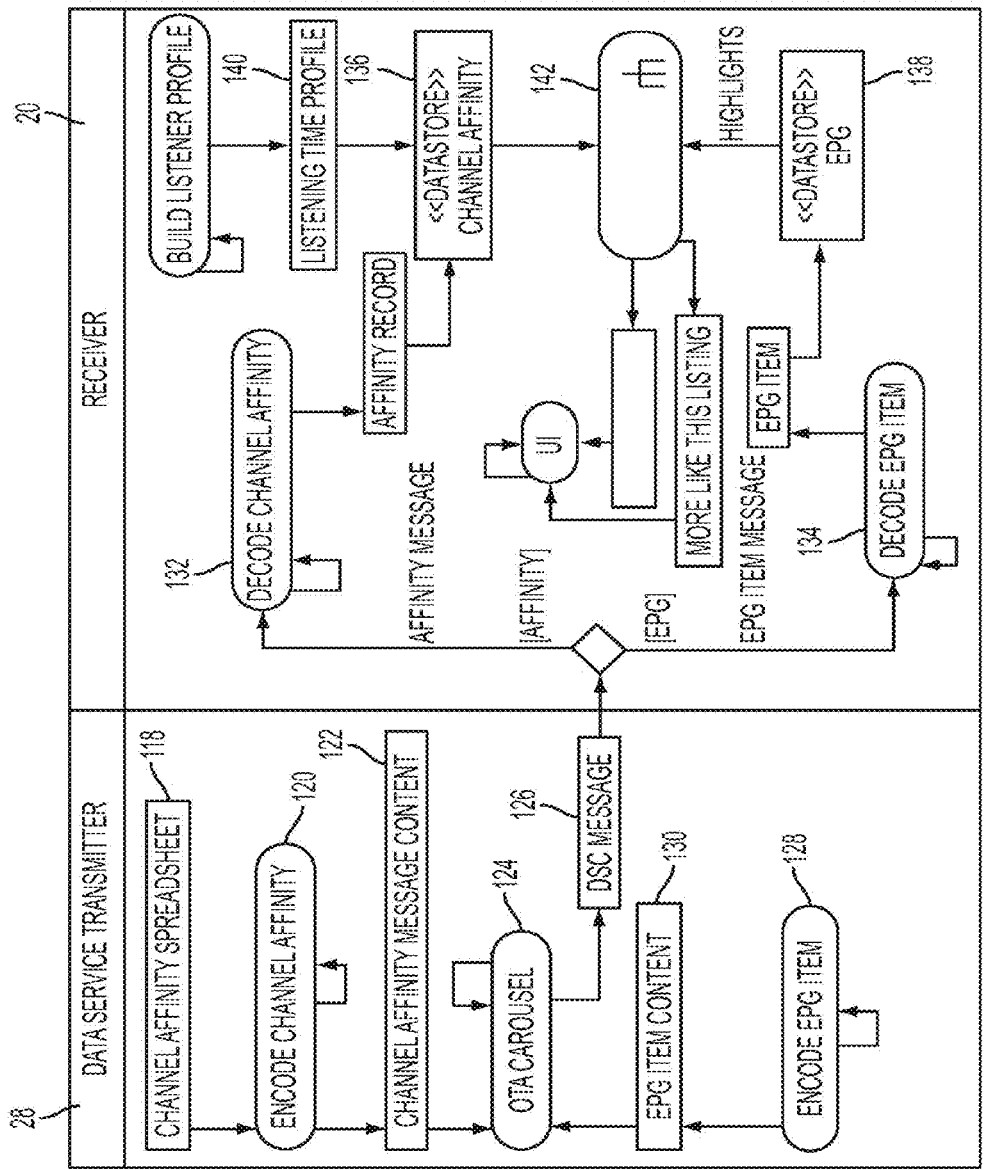
FIG. 15 depicts a basic algorithm for creating a Personal Affinity Channel List in accordance with an exemplary embodiment of the present invention.

FIG. 15 shows an illustrative structure for updating an EPG Table 26 and the user's Personal Affinity Table (e.g., FIG. 6) in accordance with an exemplary embodiment of the present invention. The service provider 24 (e.g., SDARS programmer) can generate and encode a Channel Affinity Table (e.g., FIG. 16) or spreadsheet or other data structure as indicated at 108 and 110 and provide it to a queue for transmission (e.g., over-the-air (OTA) transmission via satellite and terrestrial repeaters in one or more data messages) to receivers as indicated at 122, 124 and 126, along with or separate from transmission of encoded EPG items as indicated at 128 and 130.

With continued reference to FIG. 15, a receiver is configured in accordance with an exemplary embodiment of the present invention to receive and decode the EPG item and/or affinity data messages as indicated at 132 and 134. The decoded affinity record and EPG items are stored in respective Channel Affinity and EPG datastores (e.g., tables) indicated at 136 and 138. As described, for example, in connection with FIG. 13, a listener profile or Personal Behavior data is created using, for example, a Listening Time profile indicated at 140 and used with the Channel Affinity Table in a Affinity Filter process as indicated at 142 to create a user's Affinity Table (e.g., a "What's Hot" listing, a "More Like This" listing, among other list of personalized selected content).

FIG. 16 shows exemplary raw data input in spreadsheet form for a illustrative Channel Affinity table 32'. Half the matrix is used since the values are reflected around the slanted black line. For example, the affinities of Channel 12 are all found along the horizontal and vertical lines labeled with a letter A. Going across the horizontal line, the values above it (e.g., as indicated by the upward arrow B) are of interest. Once the diagonal line is reached, the lines in the direction of arrow C are read to find channel numbers for affinities in the column. Thus, the data required to be stored or transmitted is significantly reduced. Further, affinity values can be kept small and use only two bits, for example. A 256 channel matrix contains 65,536 cells. Requiring half the table reduces the matrix by one half or 32,768 values. As each value is two bits, four values can be placed in a byte and therefore raw storage for this table requires 8192 bytes. For transmission, these bytes can be further reduced by using common data compression methods.

User Interfaces for Receivers

Reference is now made to FIGS. 17-22. FIGS. 17-22 are exemplary screen shots of a simple receiver 20 user interface (UI). In accordance with an exemplary embodiment of the present invention, an SDARS radio receiver application is provided that uses a listening profile, an Affinities table and EPG program table (e.g., a Highlights table or other table) to perform "More Like This" and "What's Hot" operations.

Initially, the receiver 20 commences operation with a default Topic Affinity table and/or Channel Affinity table and empty user listening profiles or Personal Behaviors. The receiver 20 receives updates to the Affinity tables 32 and EPG table or Program Schedule 26 over the air, for example. The illustrative receiver 20 in FIG. 4 has six preset buttons labeled "1" through "6" respectively, four navigational buttons (e.g., "<<<", "<", ">", and ">>") and two dedicated feature buttons. Pressing the feature button (e.g., the "More Like This" button or "What's Hot" button) initiates a command to the receiver to create a list of channels that the listener may also like based on his current listening profile or Personal Behaviors. This feature selection can also be initiated by voice command, menu selection, a button on the steering wheel, a touch screen press, and so on.

Figure 18:
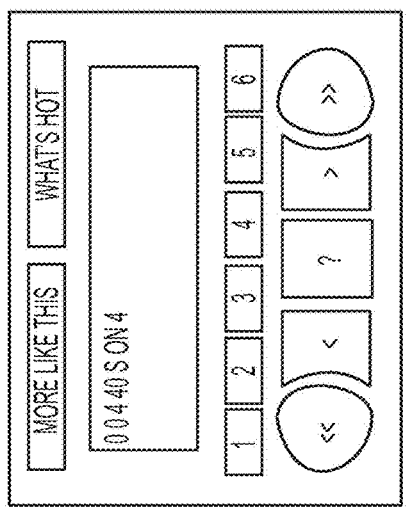

In the illustrated example, a user has navigated to channel 7, as indicated in FIG. 18, and has listened to it for 30 minutes. He is now beginning to create a listening profile. The receiver 20 can store multiple profiles for this driver, as well as one or more profiles for other drivers of the vehicle in which the receiver is used. The driver can be identified by a ignition key ID, a door unlock code, a fingerprint scan, or any other means that a vehicle uses to identify a driver. The driver can be assigned multiple profiles based on which day and time of day he is listening. A driver's listening profile may change when the vehicle has a passenger and therefore another set of profiles are kept for when there is a passenger detected by the vehicle. Multiple profiles help selecting the best affinities for the current time. For example, the driver may listen to news in the morning, rock music on the way home on a weekday, and soft music on a Saturday evening when there is a passenger in the car. The affinity selection process uses more than just the amount time spent tuned to a channel.

In the illustrated embodiment shown in FIGS. 17-22 some exemplary data that may be generated by the receiver 20 to determine Personal Behaviors and to calculate Personal Affinities follows:
Preset, Channel, Label
Audi Channel, Label, SID, Minutes,
Weight
4, 40s on 4, 4, 2.28, 2
7, 70s on 7, 7, 31.38, 10
Total Listening Time: 33.663
Affinity with Channel, Label, Weight
55, Margaritaville, 1010, LIVE from
Margar
57, Grateful Dead, 1010, Grateful Dead
27, The Bridge, 1002, Paul McCartney
6, 60s on 6, 22
10, The Roadhouse, 20
15, Folk Village, 20
46, Classic Vinyl, 20
49, Classic Rewind, 20
8. 80s on 8, 18
5, 50s on 5, 14
23, SIRIUS XM Love, 12
As indicated above, a user who has tuned to channel 4 and then tuned to channel 7 may also like content playing on channels 55, 57, 27, 6, 10 and so on.

Listening profiles or Personal Behaviors are also designed to age. In other words, listening intervals are time-stamped and, as intervals become older, they are eventually dropped from accumulated listening times on the various channels by the receiver. This helps the receiver application's algorithm to stay current with the listener's more recent interests.

A weight given to a topic or channel in the affinity selection process of the receiver application can be nonlinear and/or rounded off. This helps the receiver application's selection algorithm to temper the degree of liking one topic or channel over another based solely on listening time and to force channels or topics to group to the same level of affinity as needed. For example, the time profile may show that the listening time on one channel is 10 times more than the listening time on another channel; however, the listener favors the first channel as much as the second channel and not one tenth as much as the listening time indicates. In this case, the affinity algorithm can determine that the listener likes the first channel about one third as much by applying a square root function after converting listening times to percentages of total listing time.

Figure 19:
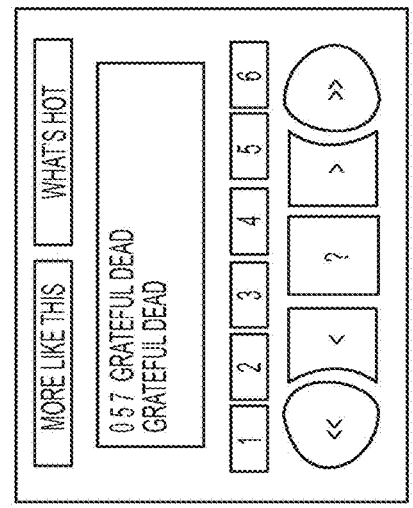
FIGS. 17-22 depict screen shots of a simple receiver user interface in accordance with an exemplary embodiment of the present invention.

In FIG. 19, the user has used the navigation keys on the receiver 20 to view the first choice in the "What's Hot" list (e.g., channel 55). Once the user has listened to this channel for several minutes or more, it will become part of that listener's profile or Personal Behaviors data, and no longer suggested in a future list "What's Hot" in accordance with one exemplary embodiment. The user can use the left and right arrow buttons on the receiver UI to move through the first five channels in an affinity list. If the user thereafter initiates "What's Hot" once more, then those first five channels will be discarded from the list and the next five channels on the affinity list are made available for browsing back and forth. These operations can be done until the list is exhausted.

Figure 20:
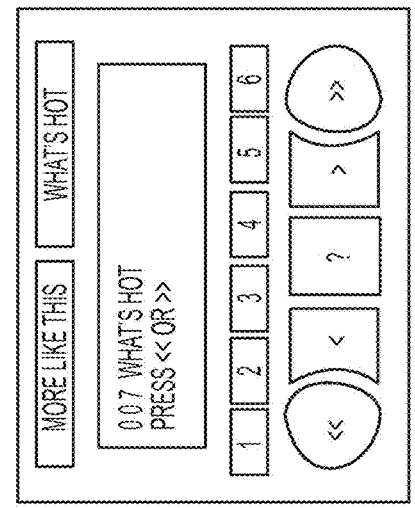
Figure 17:
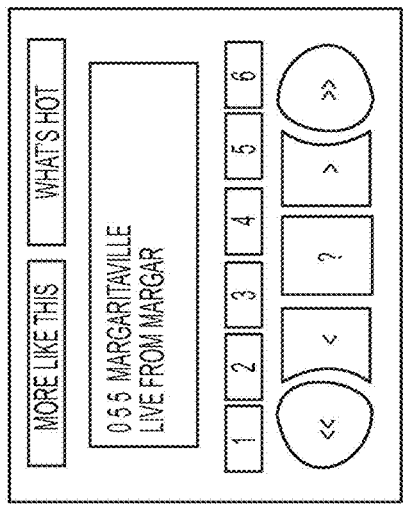
Figure 21:
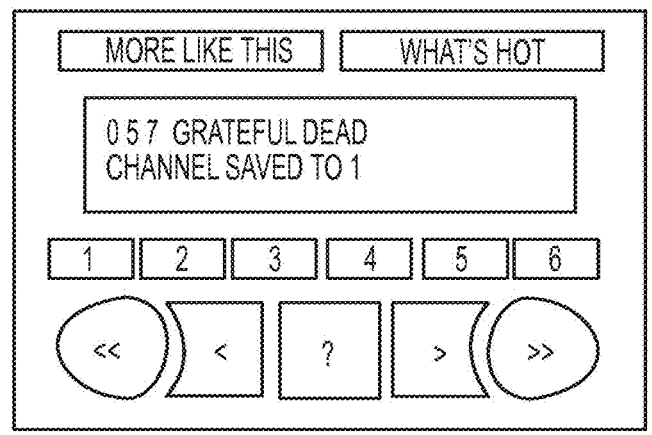

In FIG. 20, the user has used the navigation keys on the receiver 20 to move through the list to channel 57. In accordance with one illustrative embodiment of the present invention, the user can save a selection from the affinity list to a preset channel, as illustrated in FIG. 21. Alternatively, in accordance with another illustrative embodiment of the present invention, the preset buttons are temporarily used to navigate six choices in the affinity list in lieu of the preset channel selection after the user initiates, for example, a "What's Hot" or "More Like This" feature. A timeout period, or the pressing of one or more other buttons, can be used to return the preset button assignments from the affinity list settings back to the preset channel settings. In this mode, the user can press and hold a preset button to save the new channel as a preset channel.

Figure 22:
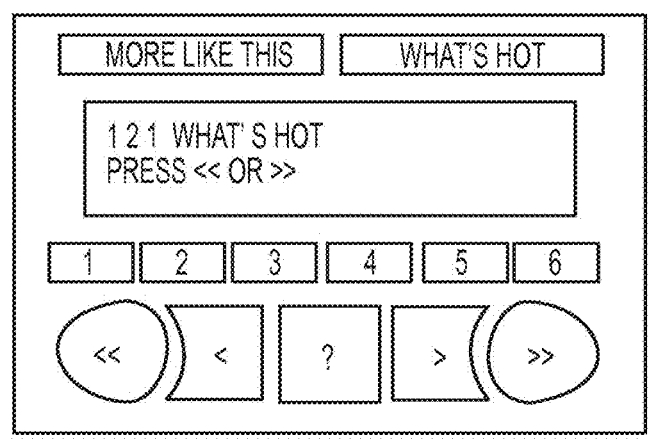

Once a "What's Hot" or "More Like This" or similar function is initiated, the receiver UI can provide some modal feedback. For example, as shown in FIG. 22, the second text line on the UI display instructs the listener or driver to use the navigation keys to see the items on the affinity list. In a voice-activated system, the feedback could simply be playback of a recorded statement instructing the driver as to what should be said next to attain the next navigation operation (e.g., "next" or "back" to hear spoken list entries in the order desired by the user).

Figure 23A:
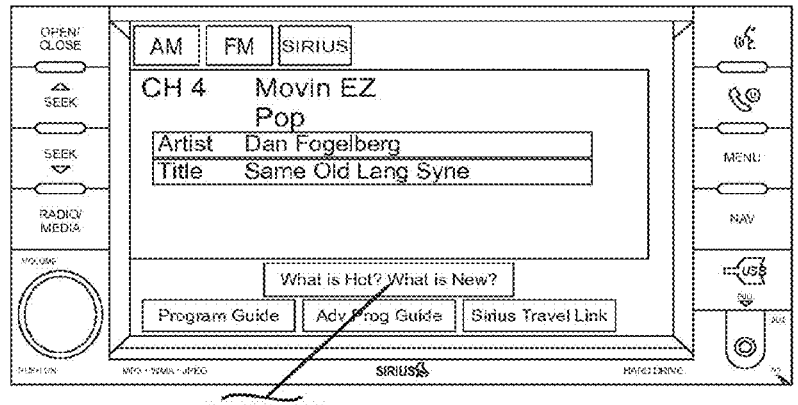
FIGS. 23A, 23B, 23C, 23D, 23E, 23F, 23G, 23H and 23I depict an SDARS EPG user interface in accordance with an exemplary embodiment of the present invention.
Figure 23B:
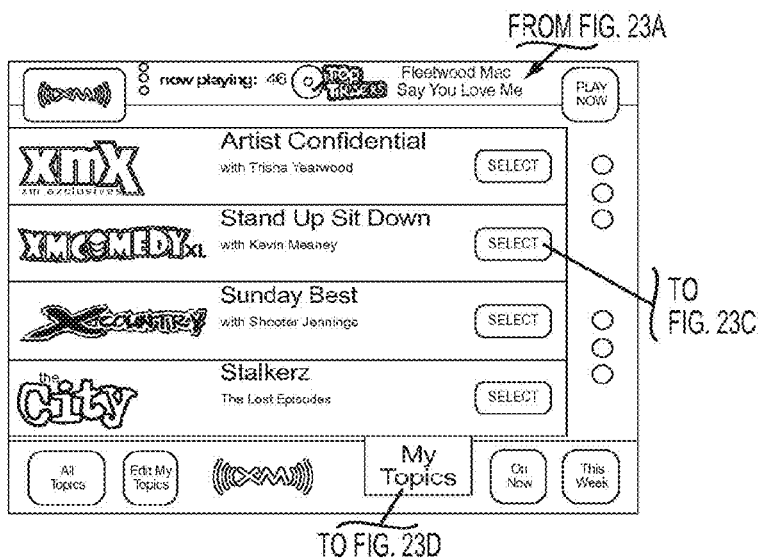

FIG. 23A depicts an illustrative Satellite Digital Audio Radio Service (SDARS) Electronic Program Guide (EPG) user interface in accordance with an exemplary embodiment of the present invention. Through user interface (UI) controls provided by the receiver, a user can select, for example, the "What's Hot? What's New?" button and the receiver will display the selected feature, as depicted in FIG. 23B. The channels listed in FIG. 23B can be selected from the EPG in a manner described above.

Figure 23C:
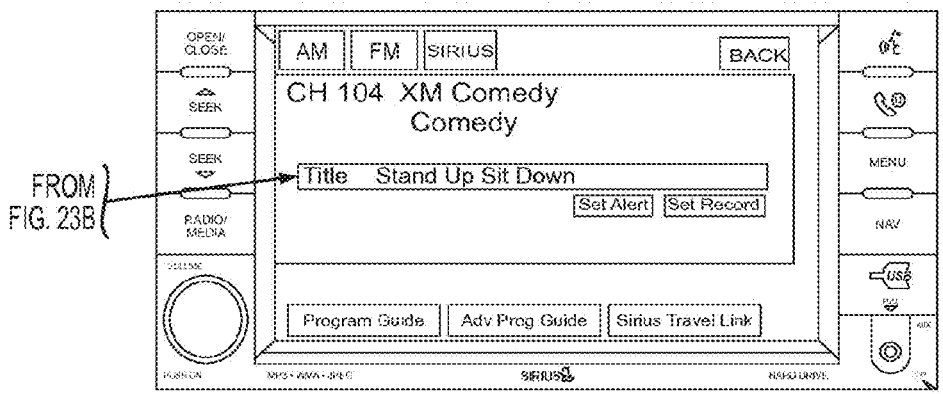

In FIG. 23B, when the user selects the "Sunday Best" programming, the system brings up another display of the selected feature, as depicted in FIG. 23C. In FIG. 23B, when the user selects "My Topics", the system brings up another display of the selected feature, as depicted in FIG. 23D.

Figure 23D:
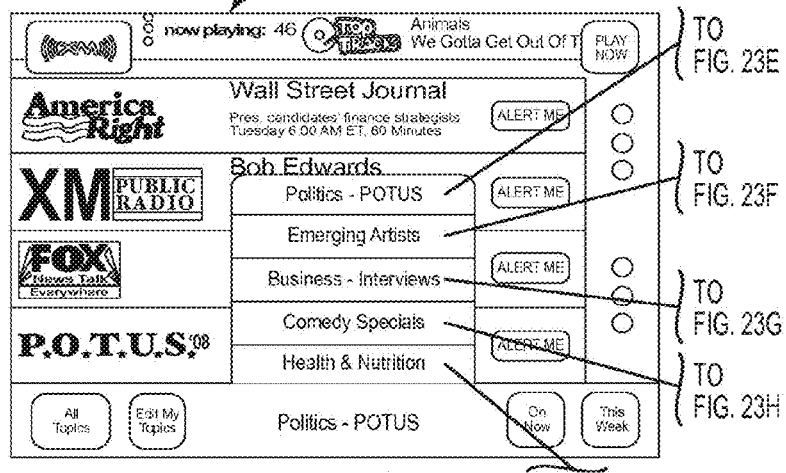
Figure 23E:
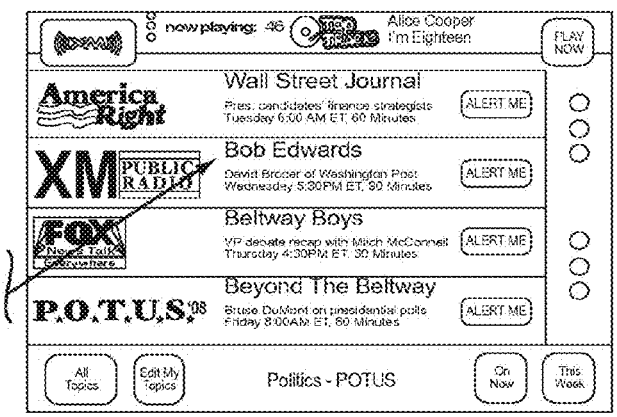
Figure 23F:
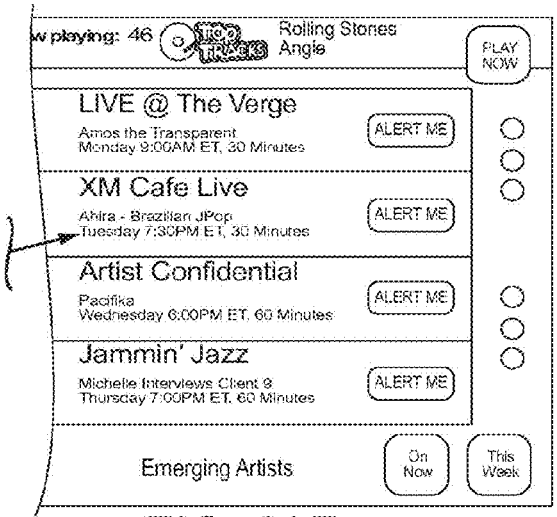
Figure 23G:
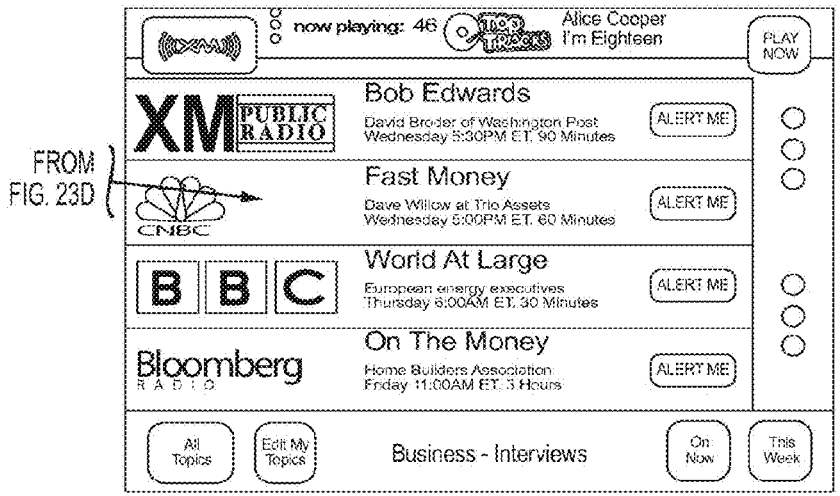
Figure 23H:
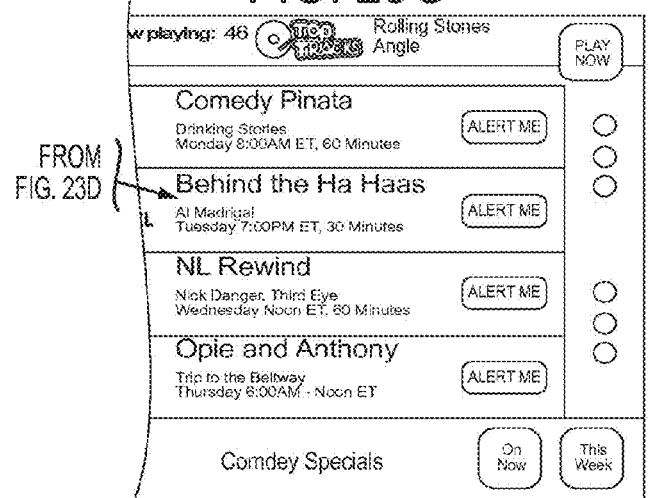
Figure 23I:
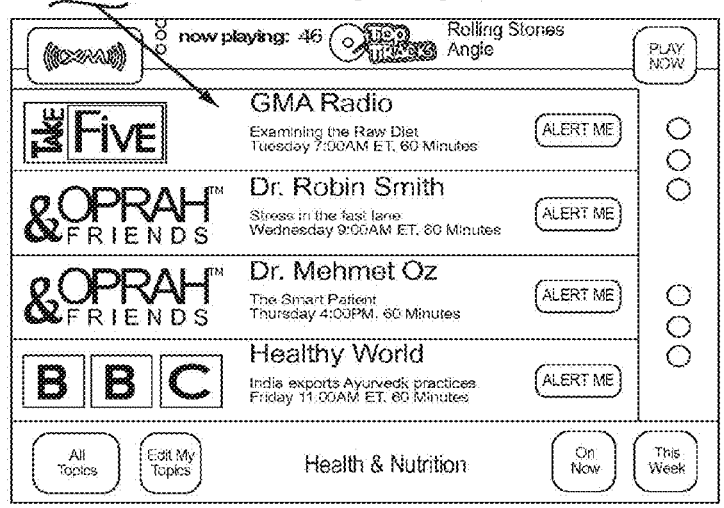

FIG. 23D depicts the user's selection of "My Topics", wherein the type of content (e.g., channels) is classified according to program topics preferred by the user (e.g., politics, emerging artists, business, comedy specials, and health and nutrition). The program topics can be identified automatically by the receiver (e.g., using listening histories) or identified by the user using a UI on the receiver (e.g., see FIG. 14E) or via a personal computer application and connector to the receiver, for example. When the user selects the first program topic (e.g., Politics), the receiver uses the EPG, Topic/Subtopic Program assignment data, and optionally Channel Affinity tables to display selected channels related to that topic, as depicted in FIGS. 23E-23I respectively.

Figure 24A:
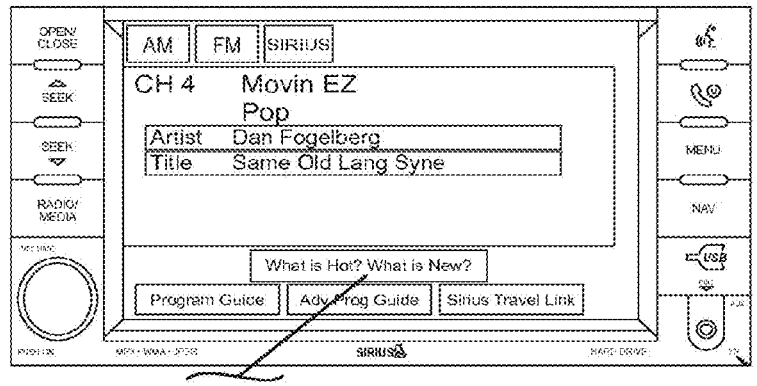
FIGS. 24A, 24B, 24C, 24D, 24E and 24F depict an SDARS EPG user interface in accordance with an exemplary embodiment of the present invention.

FIG. 24A depicts an illustrative Satellite Digital Audio Radio Service (SDARS) Electronic Program Guide (EPG) user interface in accordance with an exemplary embodiment of the present invention. Through user interface (UI) controls provided by the receiver, a user can select, for example, the "What's Hot What's New" button and the receiver will display the selected feature, as depicted in FIG. 24B.

Figure 24B:
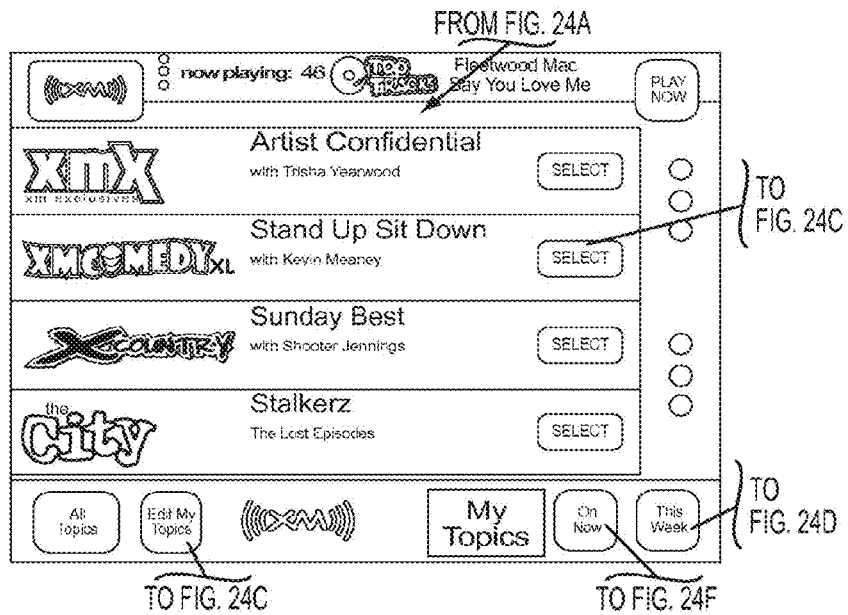
Figure 24C:
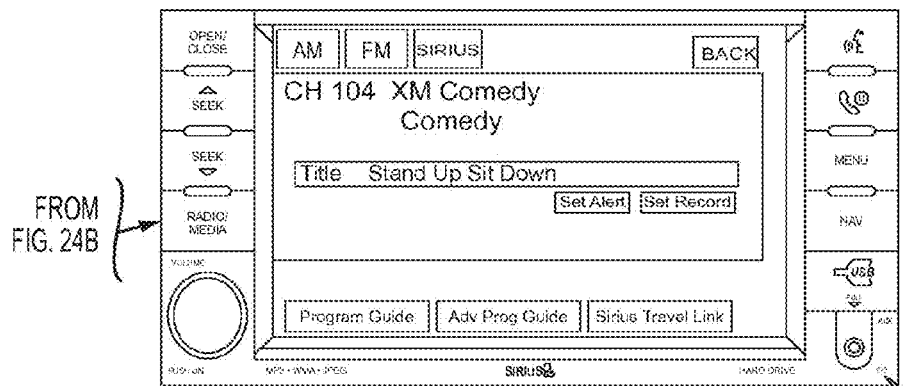
Figure 24E:
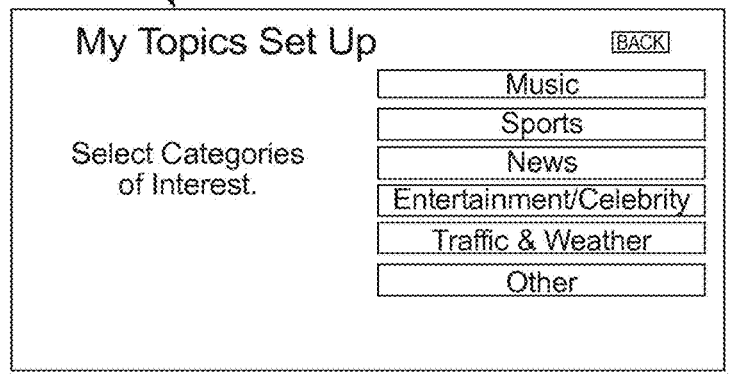
Figure 24D:
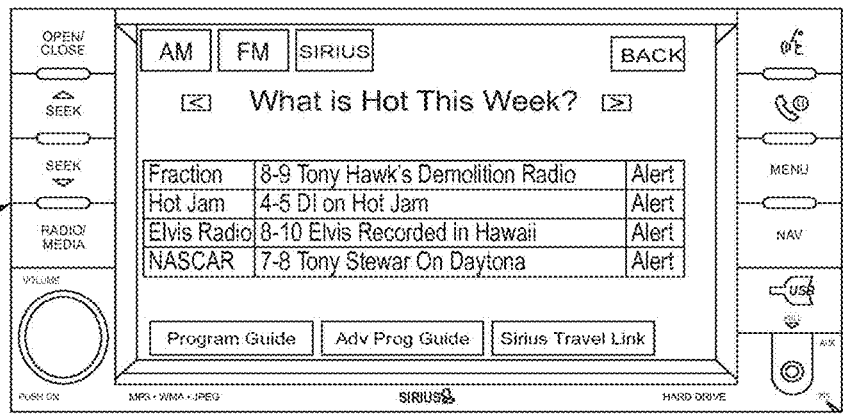
Figure 24F:
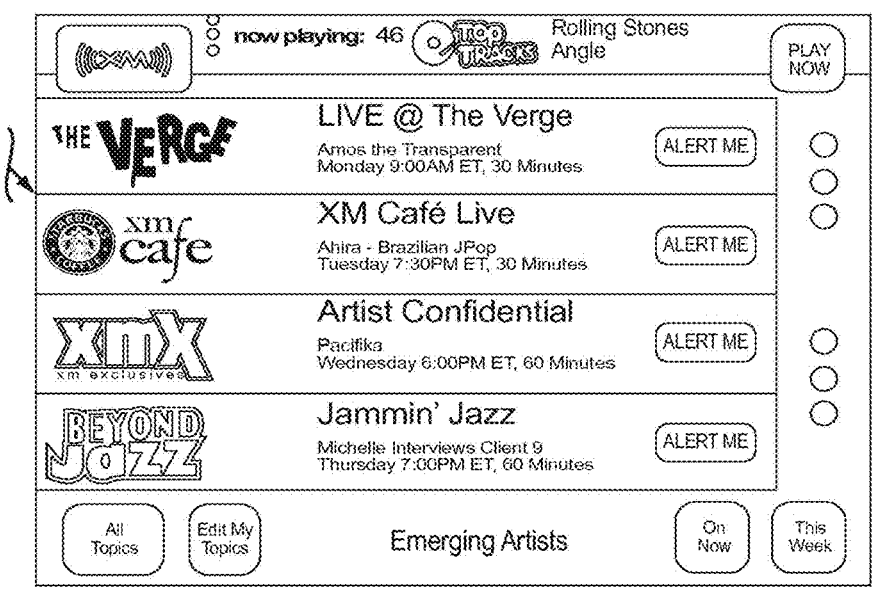

In FIG. 24B, when the user selects the "Stand Up Sit Down" programming channel, the receiver generates another display of the selected feature, depicted by FIG. 24C. In FIG. 24B, when the user selects "This Week", the receiver generates another display of the selected feature, depicted by FIG. 24D, which displays a number of programs and their channels and dates and times corresponding to "What's Hot This Week" as determined, for example, in accordance with the illustrative method described above. If the user selects the "Edit My Topics" button, the receiver generates another display of the selected feature, depicted by FIG. 24E that allows the user to browse and select topics of interest. Again in FIG. 24B, when the user selects the "On Now" button, the receiver generates another display of the selected feature, depicted by FIG. 24F, which displays the programs under "What's Hot What's New" that are currently being delivered to the receiver.

The following are exemplary use scenarios for mining diverse content from a content stream based not only on user preferences (e.g., Personal Behaviors) but on data (e.g., Channel Affinity table) provided by a content or service provider or programmer to facilitate discovery of the content that may be of interest to the user. For example, the receiver can be configured to display a "Programming Tip Of the Day," that is, each time the receiver is powered, it generates a display that shows brief information about a highlighted show (e.g., selected by the content provider) being broadcast or otherwise delivered later that day and/or now playing, so that the use can listen immediately.

In addition, the receiver 20 or other user device can be configured to display, in response to activation of a "What's Hot" button, a menu of not only the programs on the highlighted channels that are currently being delivered but also a menu of programs on highlighted channels for the day or other selected time period. In other words, the "What's Hot" display screen can include a soft button for Highlights—Today to show future highlighted programs in addition to Highlights—Now.

Similarly, the receiver 20 or other user device can be configured to display EPG—On This Channel to see a simple list of programming for a selected channel for the day or other selected time period. In addition, the receiver or other user device can be configured to display full EPG to allow a user see what is on all delivered program channels over a selected time frame (e.g., over the next four hours or for the day).

The receiver or other user device can be configured to simplify a user's indication of preferred programming to facilitate building Personal Behaviors data. For example, while a user is enjoying listening to a particular program, a user can operate a hard or soft UI button or otherwise operate a menu sequence that adds the current program to the user's stored "EPG Favorites" if the user would like the receiver to highlight similar content delivered in the future. Later, the user can select a EPG—Favorites menu option or button and see a listing of forthcoming scheduled delivery of similar programs. For example, the receiver can save the title of the currently playing show from the EPG schedule, and later perform a "fuzzy match" to determine future EPG program titles to find shows the similar content. Further, the receiver or other user device can be configured to display the a list of today's highlighted shows that are on the channels now programmed as Preset buttons when an "EPG—On My Favorites" hard or soft button or UI menu option is selected.

What's Hot Scanner

Radio receivers 20 or other user devices can be configured with a "What's Hot Scanner" function in accordance with an exemplary embodiment of the present invention that requires no additional EPG data beyond, for example, what is already provided by a EPG as discussed above. When invoking the "What's Hot Now" function, the device UI allows the user to start a "scan" through the "What's Hot" list by playing 10 seconds or other time interval while on each channel in the list, and to stop the scan if he hears something of interest. Thus, the "What's Hot" feature can be provided in low-end receivers having relatively simple displays (e.g. 2 line text displays).

Promotional Notification

In accordance with an exemplary embodiment of the present invention, fields can be provided in the transmitted EPG data that can be used by receivers to alert users to promotional "Free Listening Periods" (e.g., trial periods where selected content is available at the receiver without a subscription every few months or so for a couple of weeks). For example, the receiver that is otherwise de-activated would continuously monitor the EPG data channel, which would be free-to-air and received even for deactivated receivers. If it detects changes in the EPG data that indicate a promotional program is underway, it would alert the user in some way via the receiver UI. Furthermore, the UI would direct the listener to which specific channels were free to air, offering description information. A brief "notification" field could carry a specific message from marketing/programming about the promotion (e.g., who to call, what the "deal" is, and so on).

EPG-Lite: What's Hot for Now Only

Storing the entire weeks' worth of EPG data may require too much receiver power, processor power or storage space for some receiver products. In accordance with an exemplary embodiment of the present invention, these products can be configured to provide "What's Hot" features only for currently playing programs, and not the full week of EPG data and related features, for example.

EPG for Programming Group to Identify Programs for Cached Recording

Some receivers are capable of multi-channel, background recording. In accordance with exemplary embodiments of the present invention, these receivers can be configured to implement "speculative" background cached recording of selected "featured" programs. The recorded programs would be offered to listeners in a list of programs available for "on demand" listening. The speculative recordings would be made preferably without requiring user interaction, and would be in addition to any recordings specifically requested by the user. The EPG database in server 28 can be used by the content or service provider 24 to identify (e.g., tag) which programs are preferred candidates for speculative background recording, and optionally further prioritized for recording based on the Personal Affinity methods described previously.

Include Program "Action Tag" Cross-Referencing in EPG

In accordance with an exemplary embodiment of the present invention, "action tags" can be included in the EPG Table 26 that would be used for identifying playing programs for other features such as "Jump", audio promotionals (e.g., a DJ talks about a program on at a future time and/or different channel), supporting content from one provider on another providers transmission channel (e.g., RF band), and so on. The EPG is configured to preferably link to these features rather than exist independently of them.

For example, a new capability might allow a user to push a "more info" button while the DJ talks about an upcoming show. With this action, the receiver retrieves an "action tag" associated real-time with the tuned channel. This tag can then be cross-referenced into the EPG data, such that all of the information in the EPG Table about the program being discussed is made available for display or action (e.g., show description of the program, set future alert, set future record session, etc.).

Also, for example, a user can press a "more info" button about a program described by a DJ on another channel and is offered to jump there now. If the listener cannot listen immediately, the receiver is configured to allow him to use the facilities of the EPG to "find alternative times" in which the same program is being broadcast, and to set an alert for the one program time most likely to correspond to his listening schedule.

In addition, an "audio program guide" channel can be added that continuously repeats a loop of "What's Hot" as an audio channel, supported by background action tags transmitted during the audio. A user is encouraged to tune to this channel to hear about what is on (e.g., similar to EPG "What's Hot," but audio-based). For receivers that support the EPG Table 26 and background tags, the user can press a "more info" button during a discussion of another show and thereby access all of the data and services in the EPG Table associated with the referenced program.

Audio Descriptions

In accordance with an exemplary embodiment of the present invention, an EPG entry is configured to optionally reference an "audio object" such as a cached, downloaded brief audio recording promoting or describing a program that the user could listen to on demand. The brief audio files can also be transmitted as part of or in addition to the content stream.

Channel Descriptions

In accordance with exemplary embodiments of the present invention, enhanced channel descriptions are provided to assist the listener in understanding the kind of content played on each channel, particularly for new users. For example, the receiver can be configured to display a brief, text description for each channel. Illustrative fields that can be supported are:

Short Description: Alternative rock's pioneering artists and songs.

Medium Description: Tune in to 1st Wave where you can still listen to classic alternative music from artists like Depeche Mode, U2, and The Smiths.

Long Description: First Wave plays the great songs that helped bring "alternative rock" to the forefront of pop culture and awareness in the 1980s. It plays music when individual expression thru music trends was first accepted, and everyone wanted to look like the video stars of MTV. Hear the first wave of alternative music from the era that defined alternative. If you ever wore a skinny tie, had spiked hair, or pogoed to the beat, 1st Wave is for you. Longer on synthesizers than guitars, First Wave makes it okay for rock fans who want to dance!

Genres: New Wave, '80s Alternative, Post Punk, Retro Rock, Britain Pop Rock

This information can then be used by the receiver UI when providing a "more info" option, so a user can instantly learn about an unfamiliar channel. Different receiver products can be configured to use one or more of the description fields, depending on capability (e.g., limited display units might employ only Short Descriptions or Genres only, whereas a receiver in a vehicle having a large color navigation display may use all or most of the fields).

This channel description information can be compiled into a receiver product as a Baseline Database, with the EPG providing updates when and only when the descriptive information changes. Due to the slow carousel cycle time needed and small amount of data required, this does not add significantly to the EPG bandwidth.

Additional content discovery value can be provided to the exploring user when this channel description information is combined with the channel affinity data. The user can then be informed of "more stations like this" when exploring channels and using the channel affinity data.

New Channel Notification

In accordance with an exemplary embodiment of the present invention, a receiver 20 can be configured to inform a user of a new channel coming on air. The receiver is configured to support, for example, a class of "Feature" highlight that pertains to an entire channel instead of a particular program. This class of Feature describes the new channel or links to Channel Description data, and can also describe when the new channel going live or went live, and so on. Presentation options can range from an alert style to simply including the notification in the list of upcoming "What's Hot" Features. Optionally, the alert or sorting of the new channel notification can be further prioritized by Channel Affinity and Personal Affinity data (e.g. alert if channel/personal affinities calculate the particular listener would likely find the channel interesting, or merely place it in general Feature highlights if the particular listener would not find the channel interesting). This function is advantageous because it does not increase EPG Table bandwidth significantly.

It is to be understood that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and can be envisioned to include carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention has been shown and described with reference to a certain embodiment thereof, it will be understood by those skilled in the art that various changes in form and details may be made therein without departing from the spirit and scope of the invention. Consequently, the scope of the invention should not be limited to the embodiment, but should be defined by the appended claims and equivalents thereof.

What is claimed is:

1. A method of presenting a personalized electronic program guide (EPG) for a broadcast having a plurality of channels, the method comprising:
  receiving and storing, by a computing system, electronic program guide (EPG) data including a listing of program highlights associated with the plurality of channels of the broadcast;
  receiving and storing, by the computing system, affinities data including a plurality of cross-affinities between at least two of the plurality of channels, wherein the plurality of cross-affinities are based at least in part on one or more topics that are common between the at least two of the plurality of channels;
  receiving, by the computing system, one or more user inputs corresponding to the plurality of channels;
  calculating, by the computing system, personalized affinities data based on the plurality of cross-affinities and the one or more user inputs;
  determining, based at least in part on the personalized affinities data and based at least in part on tracking a location of the user, a prioritized subset of the plurality of channels in the EPG and a modified listing of the program highlights for the user; wherein the determining the prioritized subset of the plurality of channels is based on:
  identifying a first channel of the plurality of channels that has been tuned to over a selected period of time;
  designating a second channel of the plurality of channels as a prioritized channel based on determining that the second channel has a positive cross-affinity with the first channel and
  presenting the personalized EPG output to the user based at least in part on the prioritized subset of the plurality of channels and the modified listing of the program highlights.

2. The method of claim 1, wherein the received affinities data includes a listing of the plurality of channels and, for each listed channel of the plurality of channels, data representing a range of affinity strengths between the listed channel and some or all others of the plurality of channels, the range of affinity strengths corresponding to a degree to which, if a typical user likes a listed channel, the typical user likes the other channels.

3. The method of claim 1, wherein the received affinities data includes a listing of a group of the one or more topics and, for each of the one or more topics, data representing a range of affinity strengths between the listed topic and some or all others of the group of the one or more topics, the range of affinity strengths corresponding to a degree to which, if a typical user likes a listed topic, the typical user likes the other topics.

4. The method of claim 1, wherein the determining the prioritized subset of the plurality of channels is based on identifying programs with a positive cross-affinity to the one or more topics assigned to channels to which the user has tuned the receiver over a selected period of time.

5. The method of claim 1, wherein the determining the prioritized subset includes:
detecting a user input indicating that the user desires personalized EPG output; and
generating the personalized EPG output in response to the detected user input.

6. The method of claim 1, wherein the calculating the personalized affinities data is further based on:
determining a temporal listening history of the user to build a profile of personal preference for the plurality of channels based on daily or weekly listening habits; and
determining a spatial listening history of the user to modify the profile of personal preference based on the tracking the location of the user to determine whether the user is stationary or in motion.

7. A user device configured to generate a personalized electronic program guide (EPG) for a broadcast including a plurality of programs playing concurrently on a plurality of channels and affinities data including a plurality of cross-affinities between at least two of the plurality of channels wherein the plurality of cross-affinities are based on one or more topics that are common between the at least two of the plurality of channels, the user device including:
at least one receiver for receiving the broadcast EPG data including the plurality of programs, and the plurality of cross-affinities;
memory for storing at least the EPG data and the plurality of cross-affinities and a processing device configured to:
generate user behavior data of a user, the user behavior data including a user weighting for each of the plurality of channels;
calculate personalized affinities data based on the user behavior data and the plurality of cross-affinities;
determine a prioritized subset of the plurality of channels based on the personalized affinities data and a spatial listening history of the user, wherein the spatial listening history of the user is based on tracking a location of the user; wherein the determining the prioritized subset of the plurality of channels is based on:
identifying a first channel of the plurality of channels that has been tuned to over a selected period of time;
designating a second channel of the plurality of channels as a prioritized channel based on determining that the second channel has a positive cross-affinity with the first channel and
present the personalized EPG output to the user based at least in part on the prioritized subset of the plurality of channels in the EPG.

8. The user device of claim 7, wherein at least one of:
(i) the affinities data stored in the memory includes at least one of a listing of the plurality of channels and, for each listed channel, data representing a range of affinity strengths between the listed channel and some or all of the plurality of channels, the range of affinity strengths corresponding to the degree to which, if a typical user likes a listed channel, the typical user likes the other channels; and
(ii) the selected programs correspond to programs on at least one of the plurality of channels having a designated affinity strength with one or more channels to which the user has tuned the receiver over a selected period of time.

9. The user device of claim 7, wherein the processing device is further configured to select programs from the listing of programs based at least in part on the user behavior data and the received affinities data, the selected programs being at least one of programs that are being currently broadcast and received on the subset of channels, or programs that are being broadcast and received on the subset of channels during a designated future time period,
and wherein at least one of:
(i) the affinities data stored in the memory device includes at least one of a listing of the group of topics and, for each listed topic, data representing a range of affinity strengths between the listed topic and some or all of the group of topics, the range of affinity strengths corresponding to the degree to which, if a typical user likes a listed topic, the typical user likes the other topics; and
(ii) the selected programs correspond to programs having one or more topics having a designated affinity strength to any of the topics assigned to channels to which the user has tuned the receiver over a selected period of time.

10. The user device of claim 7, wherein the receiver further includes a user input device, the processing device being configured to detect a user input via the user input device indicating that the user desires the personalized EPG output, and to determine the subset and generate the personalized EPG output in response to the detected user input.

11. The user device of claim 7, wherein the user behavior data includes a temporal listening history of the user based on daily or weekly listening habits for the program channels.

12. A system, comprising:
at least one processor configured to execute instructions;
non-transitory, non-volatile storage medium containing instructions, which when executed by the at least one processor cause the at least one processor to:
receive and store electronic program guide (EPG) data including a listing of programs associated with a plurality of channels;
receive and store affinities data including a plurality of cross-affinities between at least two of the plurality of channels, wherein the plurality of cross-affinities are based on one or more topics that are common between the at least two of the plurality of channels;
generate user behavior data of a user at the receiver, the user behavior data including a user weighting for each of the plurality of channels;
calculate personalized affinities data based on the user behavior data and the plurality of cross-affinities;
determine a prioritized subset of the plurality of channels based on the personalized affinities data and a spatial listening history of the user, wherein the spatial listening history of the user is based on tracking a location of the user; wherein the determining the prioritized subset of the plurality of channels is based on:
identifying a first channel of the plurality of channels that has been tuned to over a selected period of time;
designating a second channel of the plurality of channels as a prioritized channel based on determining that the second channel has a positive cross-affinity with the first channel and
present enhanced personalized EPG output to the user based at least in part on the prioritized subset of the plurality of channels in the EPG.

13. The system of claim 12, wherein the affinities data including at least one first flag associated with a respective channel that prioritizes the respective channel in the prioritized subset of the plurality of channels in the EPG.

14. The system of claim 13, wherein the affinities data including at least one second flag associated with a respective channel that prioritizes the respective channel in the prioritized subset of the plurality of channels in the EPG more than the channel(s) associated with the at least one first flag.

15. The method of claim 1, wherein the determining the personalized affinities data further comprises:
assigning a respective user weighting for each of the plurality of channels based at least in part on a history of an amount of time the user has listened to a respective channel of the plurality of channels over a designated period of time.

16. The method of claim 1, wherein the personalized affinities data is indicative of a first flag associated with a first channel of the prioritized subset of the plurality of channels, wherein the first flag assigns a higher priority to the first channel with respect to priorities assigned to remaining channels of the prioritized subset of the plurality of channels in the EPG.

17. The method of claim 16, wherein the personalized affinities data is indicative of a second flag associated with a second channel of the prioritized subset of the plurality of channels, wherein the flag assigns a higher priority to the second channel than the first channel associated with the first flag.

18. The user device of claim 7, wherein the personalized affinities data is indicative of a first flag associated with a respective channel that prioritizes the respective channel in the prioritized subset of the plurality of channels in the EPG.

19. The method of claim 1, wherein the one or more topics are arranged into a two-level hierarchical list including a major group and a minor group, wherein the major group includes at least one of an audience, format, current affairs, and user interests.

* * * * *